US006938027B1

(12) United States Patent
Barritz et al.

(10) Patent No.: US 6,938,027 B1
(45) Date of Patent: Aug. 30, 2005

(54) HARDWARE/SOFTWARE MANAGEMENT, PURCHASING AND OPTIMIZATION SYSTEM

(75) Inventors: Robert Barritz, New York, NY (US); Peter Kassan, New York, NY (US); Per Hellberg, New York, NY (US)

(73) Assignee: Isogon Corporation, New York, NY (US)

( * ) Notice: Subject to any disclaimer, the term of this patent is extended or adjusted under 35 U.S.C. 154(b) by 1016 days.

(21) Appl. No.: 09/652,466

(22) Filed: Aug. 31, 2000

Related U.S. Application Data
(60) Provisional application No. 60/152,187, filed on Sep. 2, 1999.

(51) Int. Cl.[7] .............................................. G06F 17/00
(52) U.S. Cl. ......................................... 706/50; 709/223
(58) Field of Search ............................ 706/50; 709/223

(56) References Cited

U.S. PATENT DOCUMENTS

| | | | |
|---|---|---|---|
| 5,367,473 A | | 11/1994 | Chu et al. |
| 5,515,524 A | | 5/1996 | Lynch et al. |
| 5,590,056 A | * | 12/1996 | Barritz ....................... 702/186 |
| 5,668,995 A | * | 9/1997 | Bhat .......................... 709/104 |
| 5,754,763 A | * | 5/1998 | Bereiter ...................... 713/201 |
| 5,761,091 A | * | 6/1998 | Agrawal et al. ............ 702/186 |
| 5,813,012 A | | 9/1998 | Chase et al. |
| 5,950,010 A | * | 9/1999 | Hesse et al. ................ 361/93.4 |
| 6,122,630 A | * | 9/2000 | Strickler et al. .............. 707/10 |
| 2001/0023414 A1 | * | 9/2001 | Kumar et al. ............... 708/170 |
| 2001/0032182 A1 | * | 10/2001 | Kumar et al. ................. 705/40 |
| 2001/0051907 A1 | * | 12/2001 | Kumar et al. ................. 705/36 |
| 2002/0007330 A1 | * | 1/2002 | Kumar et al. ................. 705/36 |
| 2002/0019810 A1 | * | 2/2002 | Kumar et al ................. 705/42 |
| 2002/0095651 A1 | * | 7/2002 | Kumar et al. ............... 717/104 |

OTHER PUBLICATIONS

Abbass et al., "Or And Data Mining For Intelligent Decision Support in The Australian Dairy Industry's Bredding program", proceedings of New research in Or, ASOR, Brisbane, 1998, pps. 1–23.*

Kwon et al., "A Multilayered perceptron Approache to prediction of The SEC's Investigation Targets", ( Neural Network), IEEE Transactions on, vol.: 7 Issue: 5, Sep. 1996, pps. 1286–1290.*

Wei Fan et al., "Cost—based Modeling for Fraud and Intrusion Detection: Results from the JAM Project", Darpa Information survivability Conference and Exposition. IEEE 1999, proceedings, vol.: 2, pps. 130–144.*

Yihwa Kiang et al., "Long–term and Short–Term Strategic Planning in A Business Environment, A Qualitative Reasoning Approach", 1990 ACM 089791–146–3 /90/0010/0337, pps. 337–354.*

Lam et al., "An Extensible Knowledge Base management System for Supporting Rule–Based Interoperatbility among heterogeneous Systems", 1995 ACM 0–89791–812–6/95/ 11. Pps. 1–10.*

(Continued)

*Primary Examiner*—Anil Khatri
*Assistant Examiner*—Michael B. Holmes
(74) *Attorney, Agent, or Firm*—Ostrolenk Faber Gerb & Soffen

(57) ABSTRACT

The invention provides for tracking and day-to-day management of computer data centers. A knowledge base comprises technical and financial specifications of various storage devices and other computer hardware as provided. A modeling tool allows for the creation of various "What-If" scenarios of possible data center configurations for long term projections of the technical and financial requirements. The management and day-to-day tracking system receives information from an auditing tool that inventories the software products that are stored on the data center.

40 Claims, 38 Drawing Sheets

OTHER PUBLICATIONS

Philip Scown., "Improving The Procurement process: Humanizing Accountants With a Human Factors Education", (Association for Information systems), 1998 ACM, pps. 1–7.*

Long–term and Short–term Strategic Planning in A Business Environment—A Qualitative Reasoning Approach, Yihwa Kiang; Tsing–Hwa; 1990 ACM SIGBDP Conference on Trends and Direction in Expert Systems, pps. 337–354.*

Predictive capacity planning: a proactive approach, Chooh–Ling Sia; Yin–Seong Ho; Information and Software Technology (1997) pps. 195–204.*

Access Control for Large Collections, H. M. Gladney (IBM Almaden Rersearch Center), ACM Transactions on Information Systems, vol. 15, Apr. 1997, pps. 164–194.*

A Multilayered Perception Approach to Prediction of the SEC's Investigation Targets, Tack Mu Kwon, Member IEEE; Ehsan H. Feroz; IEEE Transactions on Nueral Networks vol. 7, No. 5, (1996), pps. 1286–1290.*

*Argis Budget,* Janus Technologies, Mar. 14, 2000, Press Release, 36 pages.

Choon–Ling Sia et al., *Predictive capacity planning: a proactive approach,* Information and Software Technology, Mar. 1997, Elsevier, Netherlands, vol. 39, No. 3, pp. 195–204.

Author Anonymous; *Maximizing Performance/Availability for Running Applications,* IBM Technical Disclosure Bulletin; vol. 34, No. 5, Oct. 1, 1991, pp. 102.

Grummitt A.; *Automating terprise performance management,* Capacity Management Review, Mar. 1998, Demand Technol, USA, vol. 26, No. 3, pp. 1, 3–11, 14–15.

* cited by examiner

FIG. 11B

8. Enter a number in the Quantity box in the lower left corner.

FIG. 22B

HARDWARE/SOFTWARE MANAGEMENT, PURCHASING AND OPTIMIZATION SYSTEM

RELATED APPLICATION

This Application claims priority and is entitled to the filing date of U.S. Provisional Application Ser. No. 60/152,187 filed Sep. 2, 1999, and entitled "HARDWARE/SOFTWARE MANAGEMENT, PURCHASING AND OPTIMIZATION SYSTEM."

BACKGROUND OF THE INVENTION

The present invention relates to the management of the hardware and software of data centers and, more particularly, to the management of information about existing, planned or proposed hardware and software assets of the data centers in a way that combines and correlates such Asset Management information with inventory and usage data ("Auditing Data") pertaining to the installed software of the data center.

The Asset Management Data

Data center managers, capacity planners and financial planners are periodically required to evaluate the technical capabilities, financial requirements and environmental requirements of the hardware and software of computer data centers, networks, corporate IT assets and other collections of computer hardware and software. The term "data center" is meant here to be broad enough to encompass any or combinations of the foregoing. The managers and planners must also periodically determine whether or not to modify, upgrade or replace the existing hardware and software or whether to purchase additional hardware or software.

Typically, the only sources of information are from sales literature and from the sales representatives of new hardware and software products. The sales representatives are not likely to be familiar with the technical, financial and environmental requirements of existing data centers. The data center managers, capacity planners and financial planners thus do not presently have a good methodology for evaluating existing software and hardware, determining whether to purchase or lease new hardware and software, upgrade existing hardware and software or to dispose of existing hardware or software. There is currently no reliable methodology for determining the financial and environmental costs of such changes. Though spreadsheet products are currently available, the spreadsheets do not take into account all the parameters of existing data centers.

The Auditing Data

Much of the software used on mainframe computers, minicomputers, work stations, and personal computers consists of proprietary software licensed from software vendors. Like book publishers, many software vendors retain the copyright on their products, and a software product license usually restricts the licensee's use of the product in several ways.

Software products are usually obtained under a perpetual license, which is equivalent to buying a copy of a book. However, software products are sometimes available on a renewable basis, which is equivalent to borrowing a book from a rental library. Software products are often licensed for use on particular computers, as determined by their serial number, and/or for a maximum number of concurrent users. Upgrades, e.g., new versions of software products, may be periodically obtained. Many vendors, especially those of mainframe and minicomputer software, offer annual subscriptions to technical support services and product upgrades. These annual subscriptions are usually called "maintenance agreements." Vendors that do not offer subscriptions to such services usually offer product upgrades at extra costs.

For almost every installation, use of computer storage space is a major cost and a major concern. A significant amount of such storage space can be wasted by unused or under-used software products, obsolete versions of software products, and duplicate copies of software products.

In some cases, an installation may wish to restrict the use of particular software products to particular users, or to charge users for their use of particular products. An installation may wish to vary the charge for particular products based on when the products are used.

Managing and controlling the use of software products can be quite burdensome, especially for larger computer installations, and can have significant financial implications.

Several major concerns in controlling software products at an installation may occur. For example, concern over what software products are installed and where they are stored may come up. Also, whether there are duplicate copies of products and where they are located may be of concern. Questions concerning how much each software product being used, by whom and when may be important. Whether any software products are being used on a computer system for which they are not licensed is always a concern. Also of importance for licensed software is whether any software products are being used concurrently by more users than the number for which they are licensed. A question of importance to the licensee is whether any software products are being used by unauthorized users. From a maintenance point of view, it is important to know whether older versions of software products are still installed and whether they are still being used and by whom.

Once installed on a computer system, a software product consists primarily of a number of executable files known as programs or modules or exe files, as well as possibly a number of non-executable files, such as data bases, profiles, est. Whether executable or non-executable, files are identified by name along with other attributes, which are usually stored in the "table of contents" or "directory" of a storage device.

A number of products presently exist that inventory the software products that have been installed on a computer system. Such products typically have a data base that relates executable or non-executable file names to the product they came from. Such an inventorying product can survey the files on storage devices at an installation, identify the computer products to which they belong, and report what products are installed on the system in terms that users can understand.

Other products exist that provide job accounting functions, for example IBM System Management Facilities. Such products detect some forms of invocation of programs (e.g., jobs or job steps), and write records detailing such invocations.

Still other products exist that monitor usage of products that have been specifically written or modified to co-operate, and permit such monitoring by the monitoring product. Typically, the co-operating program would require code or a specialized module included within itself to "call" or "alert" the monitoring program to the fact that the co-operating program was invoked. In other words, the co-operating program must be modified to "inform" the monitoring program when the co-operating program is invoked. Such a monitoring product can then be used to ensure compliance with license conditions, such as number of concurrent usage.

Still other products exist that scan files for one or more specified unique sequences, e.g., text strings, and reporting back which files contain the sequence. In some of these products, if the sequence is found, the product can display the contents of the file surrounding the sequence.

Although both kinds of information—Auditing Data on the one hand and Asset Management Data on the other—are useful by themselves, they would be more meaningful and useful if they were integrated, related, coordinated, and reconciled.

However, at present, using existing tools, it is awkward to relate the two types of information. The user must typically look up the asset specifications in an asset management tool and then manually look up the corresponding inventory in an auditing tool (or vice versa).

For example, an installation wishing to determine the configuration of a computer system and certain software products which optimizes the total cost of ownership for certain users or groups of users would find this task to be laborious, error-prone, and potentially impractical if many different potential configurations needed to be evaluated.

Furthermore, there are numerous other ways in which a data center manager benefits if asset data is combined with auditing data. For example, a data center manager can answer questions and test scenarios such as:

What is the total cost of ownership of software based on usage level, i.e., heavily versus lightly used software, optionally detailed according to selected groups of users?

How should chargebacks of burdened costs be allocated to users? For example, calculate the direct costs of software usage (i.e., license and maintenance fees) and the indirect costs of operating the computer system, optionally on a per user or group of users basis.

What are the potential costs and technical requirements of moving users (or groups of users) from one actual or hypothetical configuration to another?

What are the effects (costs and technical requirements) of removing unused software?

For a group of users, what is the minimum hardware/software configuration and what is the total cost of ownership?

With a single installation having hundreds of vendors, thousands of software products, and possibly tens of thousands of computers, this process can be laborious, repetitive, error-prone, expensive, and impractical. Time is often critical—if the information cannot be obtained and evaluated before a particular date (e.g., a deadline for canceling or renegotiating a contract), it is essentially useless.

It is therefore desirable to provide an apparatus for and a method of tracking Asset Data consisting of the technical specifications, costs and environmental details of existing data centers and correlating the same with Auditing Data consisting of software inventory and usage data, in order to aid data center managers in determining the optimum acquisition, expansion and reconfiguration strategies for the data centers.

SUMMARY OF THE PRESENT INVENTION

The present invention is designed to overcome the problems inherent in not having the technical specifications, costs and environmental details of existing data centers (on the one hand) correlated and reconciled with software inventory and usage data (on the other hand).

A key aspect of the invention involves the gathering of inventory and usage information relating to software products used with a computer data center. In this aspect of the invention, there is disclosed a method and apparatus for correlating over selected time periods, such software information with displays of actual and hypothetical hardware and software configurations.

The present invention is a software program and/or a knowledge base, hereinafter, the "tool," that provides for tracking and day-to-day management of technical requirements, costs and environmental details of existing data centers, and the creation of scenarios for determining the optimum acquisition, expansion and reconfiguration strategies of the data centers as well as the forecasting of technical requirements, costs and environmental requirements of existing and proposed configurations of the data centers.

The present invention also enables the user to view information on the one hand pertaining to existing and proposed hardware and software product assets (Asset Data), and, on the other hand, software inventory and usage information (Auditing Data) in such a way that the two sets of information are correlated and associated. The tool presents Asset Data based on Auditing Data criteria and/or Auditing Data information based on Auditing Data criteria in an integrated fashion that permits the user to switch from one kind of information to the other kind in a variety of convenient ways.

The key components of the tool are an Asset Management Tool and an Auditing Tool which carry out the following main functional tasks: Data acquisition; Reconciliation and association; and Processing, display, and output.

SUMMARY OF THE ASSET MANAGEMENT TOOL

The present invention provides for tracking and day-to-day management of technical requirements, costs and environmental details of existing data centers, and the creation of scenarios for determining the optimum acquisition, expansion and reconfiguration strategies of the data centers as well as the forecasting of technical requirements, costs and environmental requirements of existing and proposed configurations of the data centers.

The invention includes a knowledge base comprised of the technical and financial specifications of various storage devices and other software and hardware. A modeling tool allows for the creation of various "What-If" scenarios of possible data center configurations for making long term projections of the technical and financial requirements of existing, modified or proposed data center configurations. The costs of individual devices, systems or data center locations, as well as the costs of proposed new equipment are tracked.

NOTE: Location is understood to mean geographical location (for example, Europe, the United Kingdom, England, London, 7 Gleneagles Court, Brighton Road, Crawley, West Sussex, RH10 6AD), physical location (for example, tenth floor, room 1001), and/or organizational location e.g. asset cost center, etc. or, for example, Isogon Corporation, UK office, sales division.

The invention also includes the ability to present technical, financial and other information of a data center at various levels, namely at the configuration, location, system and individual device levels, and the ability to prepare custom reports, tables and charts of the information.

An aspect of the invention includes an apparatus for and a method of managing hardware and software of at least one data center. Information concerning a plurality of devices is stored. One or more configurations include at least one location, at least one system within the location, at least one device group within the system, and at least one device within a device group are stored. Information that is associated with each element of the configuration is correlated and stored. A display comprising at least a portion of the configuration and at least a portion of the associated information is generated.

In accordance with this aspect of the invention, the associated information may include financial information, technical information, or a summary of financial and technical information of at least one of the locations, systems, device groups and devices of the configuration. The associated information may include contact and lessor information or history information of a device. Table information of at least a portion of the associated information of selected locations, systems, device groups and devices over a selected time interval may be generated, and a chart representing the table information may likewise be generated. A report of at least a portion of the configuration of the associated information may be generated. The configuration and associated information and the information concerning the devices may be edited.

Another aspect of the invention includes a method of and an apparatus for adding a new location to a configuration of at least one data center. A new location transaction is selected, and a name of a new location within the configuration is entered.

A further aspect of the invention includes a method of and an apparatus for adding a new system to a configuration of at least one data center. A location within the configuration is selected, and the name of a new system within the location is entered.

A still further aspect of the invention includes a method of and an apparatus for adding a new device to a configuration of at least one data center. A desired device type is selected, and the system within the configuration within the desired device type is to be added is selected. The desired device type is added to the system, and a device model is assigned to the device type. Further associated information is assigned to the device model.

In accordance with this aspect of the invention, the further associated information may include one or more of financial information, technical information and custom information.

Yet another aspect of the invention includes a method of and an apparatus for updating information in a configuration of at least one data center. A device of a configuration that is to be updated is selected, and a portion of the associated information corresponding to the selected device is selected. The portion of the associated information is updated.

An additional aspect of the invention includes a method of and an apparatus for moving a device within a configuration of at least one data center. The device within a system of the configuration that is to be moved is selected, and another system to which the selected device is to be moved is selected. A date that the selected device is to be moved is selected.

A further additional aspect of the invention includes a method of and an apparatus for disposing of a device in a configuration of at least one data center. A device within the configuration that is to be disposed is selected, and a disposal date is selected.

Yet still another aspect of the invention includes a method of and an apparatus for modeling proposed changes to a configuration of at least one data center. An existing configuration is selected, and at least one modification to the existing configuration is performed. A modification date for the modification is selected.

In accordance with this aspect of the invention, the modifications may include adding at least one device to the selected configuration, moving at least one device within the selected configuration, and disposing of at least one device within the selected configuration. Another proposed configuration may be generated, and a table or a chart may be generated for comparing the proposed configurations.

SUMMARY OF THE AUDITING TOOL

It is an object of the present invention to provide a software product to detect, monitor, report on, and control the software products installed on a computer system and their actual usage. The present invention provides a method and apparatus for monitoring the usage of computer programs which includes automatically determining and recording each instance of actual usage of particular software products, as well as the identity of each user of those products. The present invention makes it possible for a company to cancel maintenance or rental on unused or under-used products or to uncover unauthorized usage of products or to uncover usage of prior obsolete versions of products or to identify patterns of usage. In general, the present invention allows a company to manage and control the usage of products at an installation. In addition, the present invention can be used to ensure that an installation complies with its software licenses, both in terms of not running product on computers for which it is not licensed and in terms of not exceeding the licensed number of concurrent users of a product.

The foregoing and other objects are achieved in accordance with the present invention by an apparatus for determining program usage on a computer having a plurality of storage devices. The apparatus comprises first, second and third memory means, the first memory means stores a list of module names and for each of the module names stores a product name associated with it. The apparatus further comprises a surveying means that surveys the storage devices of the computer system and stores the names of all program modules stored on the storage devices in the second memory means. The apparatus also comprises an associating means which stores an association between the product names stored in the first memory means and each of the module names stored in said second memory means. It also comprises a monitoring means for monitoring the invocations of modules on the computer system, the monitoring means stores invocation data relating to invocations of invoked modules in the third memory means. Further, the apparatus comprises a correlating means that correlates invocation data and the association between product names and module names. Finally, the apparatus comprises a reporting means that outputs the correlated data.

It will be clear to one of ordinary skill in the art that the memory means described herein may comprises a number of different files or storage areas.

There are several features of the present invention which further distinguish it from prior art. The present invention does not require that programs to be monitored are modified in any way, or written with the knowledge of how the monitoring function will work. Thus, the invention does not require any particular co-operation of the programs to be monitored. Additionally, using a knowledge base, or data base, that relates component name (or other attribute) to product name, the present invention can report on usage by product, rather than simply by component.

Isogon Corporation, the assignee of the present application, has developed its own tools or family of tools which facilitates the task of viewing information by an end user regardless of the source of the underlying information. One such tool is Isogon's Galaxy suite of programs which interface with a range of Isogon Corporation products and allow those products to be run through a user interface which is defined by the Galaxy program. The Galaxy product includes a so called "VIEW MANAGEMENT" component which provides an end user a great deal of flexibility in viewing information, organizing information and maintaining information.

With a product such as the aforementioned Isogon Galaxy suite of programs, and numerous similar programs that are available in the marketplace, the present invention incorporates the feature of allowing the results/data obtained with the present invention to be exported to spreadsheets, databases, files and the like. Data items can be displayed distinctly as by use of color and the like and calculations can be displayed in spreadsheet fashion, tabular format, graphics etc.

It should also be understood that the present invention allows comparing configuration data with auditing information through the use of multiple hypothetical configurations and these comparisons can be made concurrently to evaluate total cost of ownership and the like. The term "ownership" in the phrase total cost ownership, is not limited to pure ownership, but includes such ownership rights as those obtained by lease, rent, license, purchase for limited periods of time and the like. The term "cost" in the phrase total cost ownership, is not limited solely to expenses, but also includes any revenue due to income or revenue producing activities. The results in the form of the calculations provided by the present invention can be displayed and viewed over a period of time that may be sub-divided and for which sub-totals as by month, year and the like, can be obtained.

In the preceding description the term "location" was used to describe physical locations. However, "location" can also mean the physical layout of elements relative to one another, and in accordance with the concept of the present invention, "location" also encompasses "organizations". That is, location also means and defines an arbitrary hierarchy of user-defined business entities such as enterprise, company, division, department, cost center, etc.

As used herein, the term computer or computers—used by itself—means all types of computers from single to multiple PCs to midrange computers, UNIX, mainframe, networked, etc.

Other features and advantages of the present invention will become apparent from the following description of the invention which refers to the accompanying drawings.

BRIEF DESCRIPTION OF THE DRAWINGS

1. Brief Description of the Management Tool Drawings

The invention will now be described in greater detail in the following detailed description with reference to the drawings in which:

FIGS. 11A and 11B show examples of tables generated by the table generator of FIG. 1.

FIG. 22B shows an example of a displayed representation of the operation of FIG. 22A.

2. Brief Description of the Auditing Tool Drawings

Figure 25:
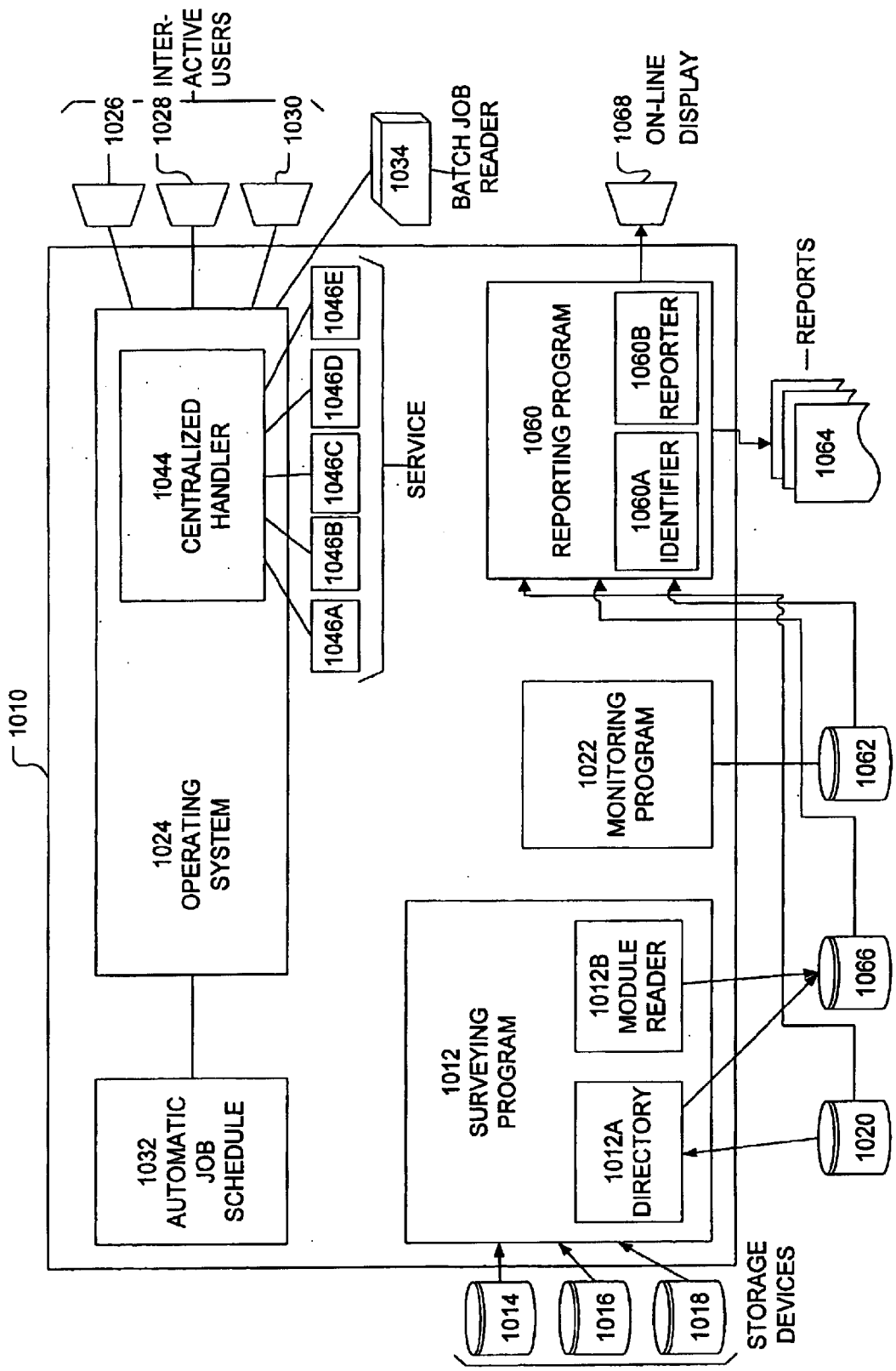

FIG. 25 is a block diagram illustrating a computing system for using the method of the present invention.

Figure 26:
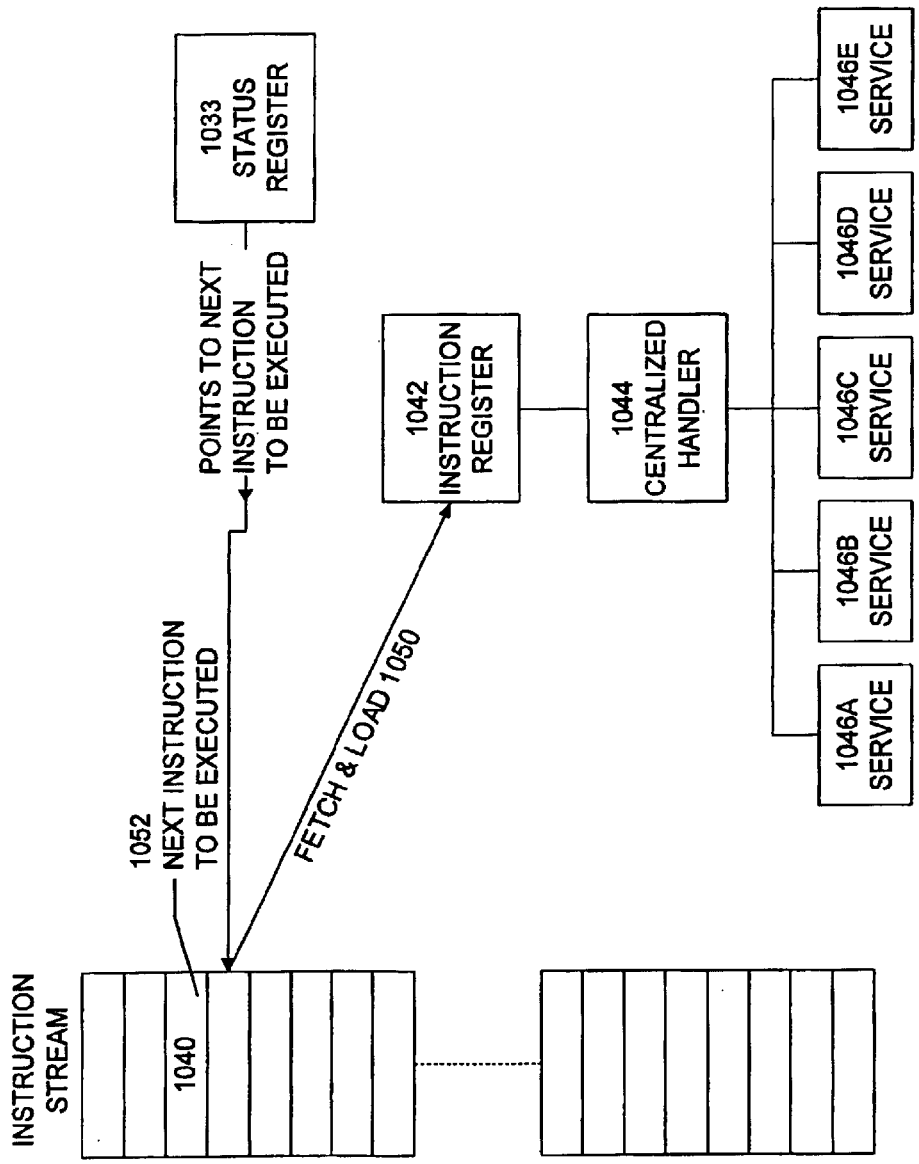

FIG. 26 is a block diagram illustrating a portion of the computing system of FIG. 25.

Figure 27:
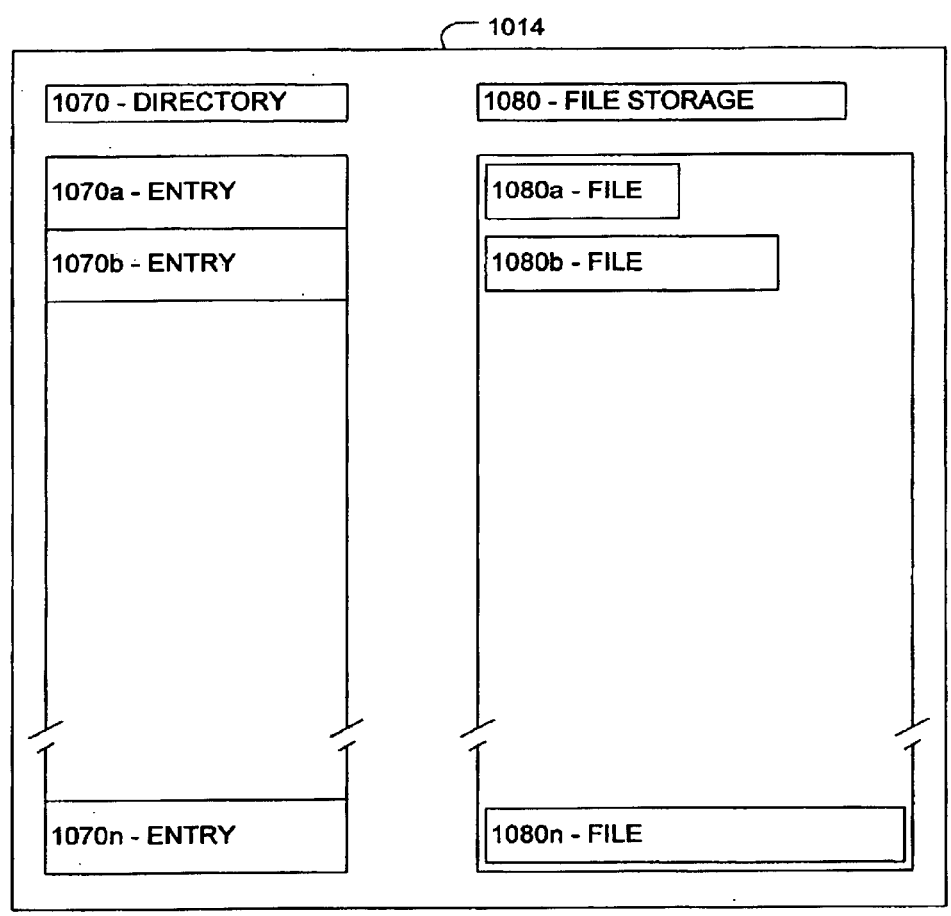

FIG. 27 is a block diagram illustrating an exemplary storage device that would be monitored using the present invention.

Figure 28:
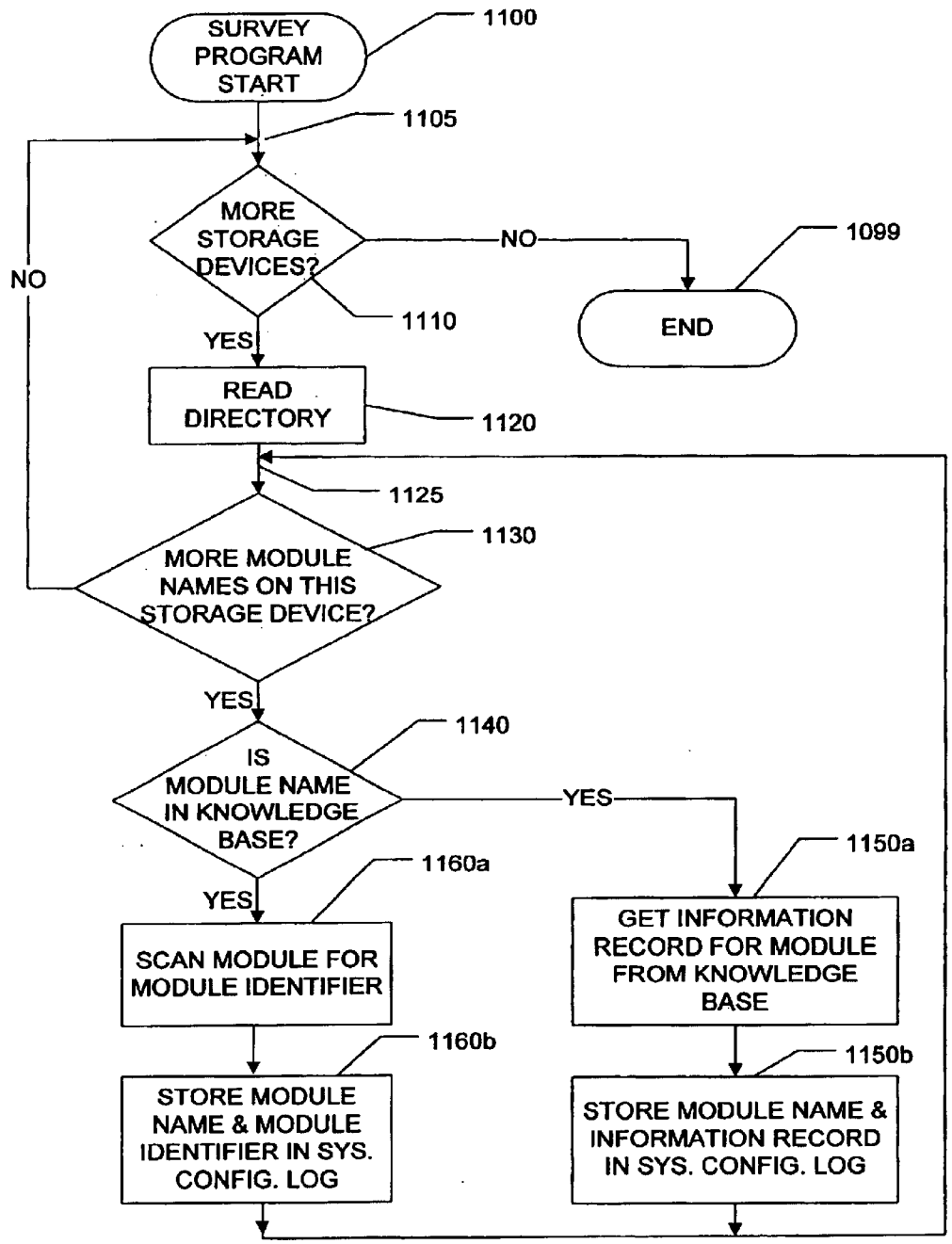

FIG. 28 is a flow chart illustrating the flow of the Survey Program.

Figure 29:
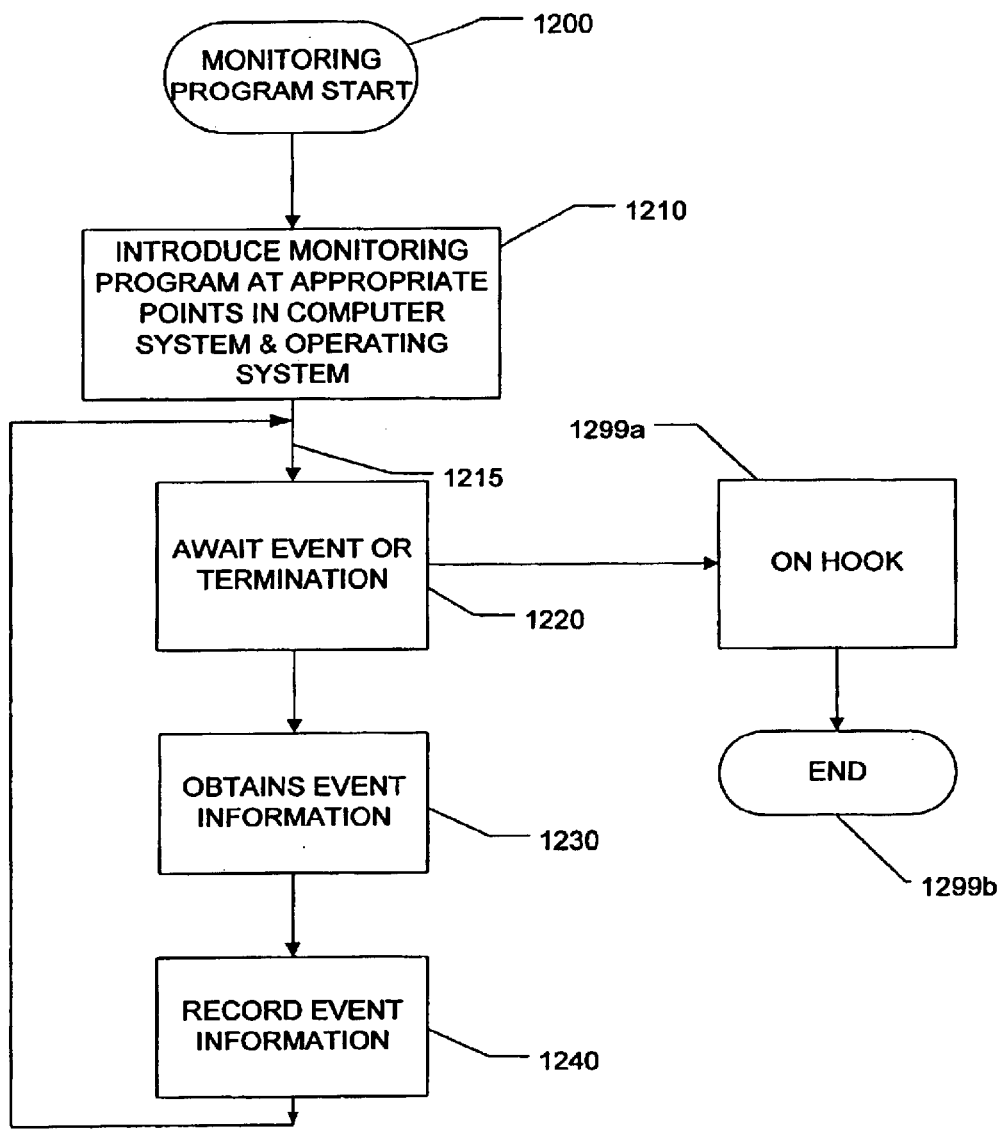

FIG. 29 is a flow chart illustrating the flow of the Monitoring Program.

Figure 30:
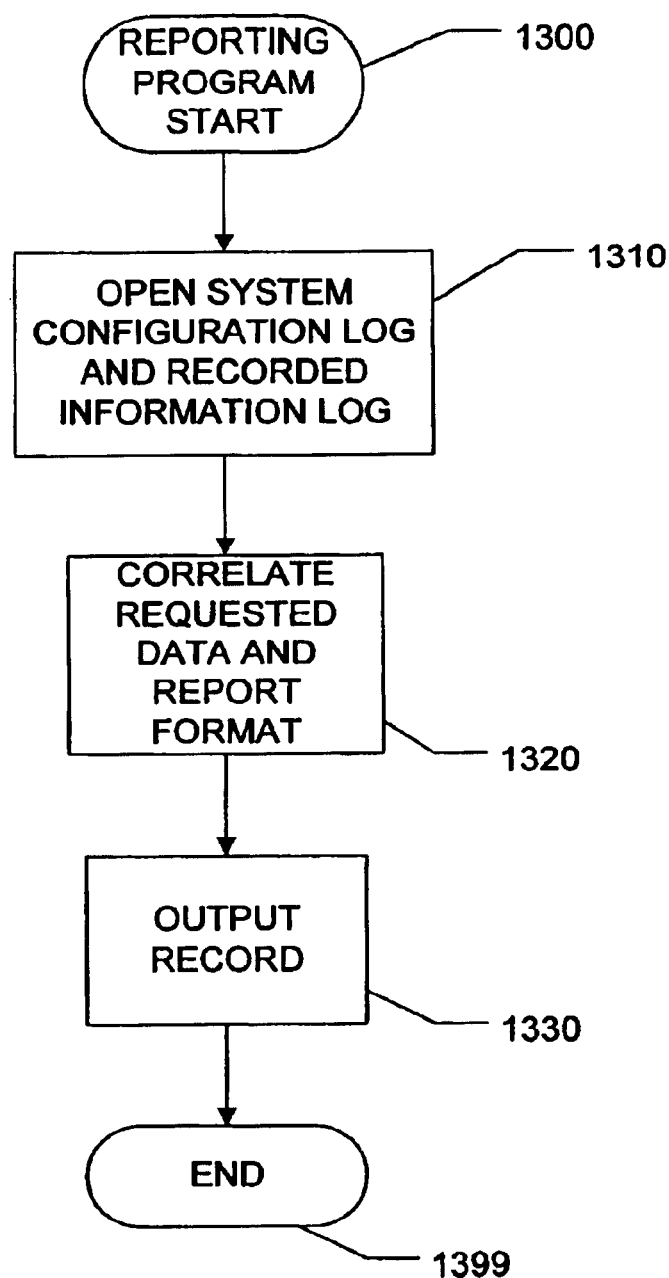

FIG. 30 is a flow chart illustrating the flow of the Reporting Program.

Figure 31:
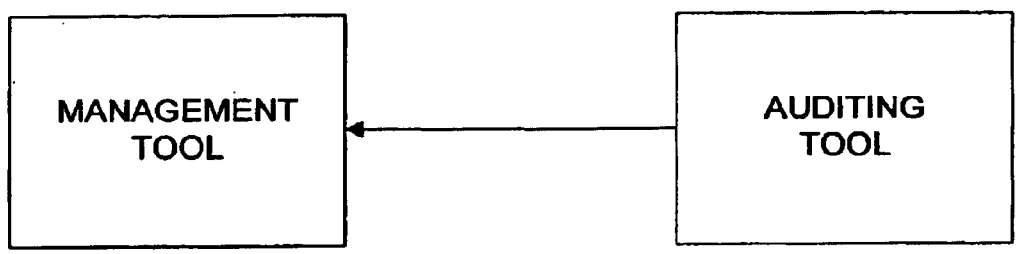

FIG. 31 shows the interfacing between the Management Tool and the Auditing Tool.

Figure 32A:
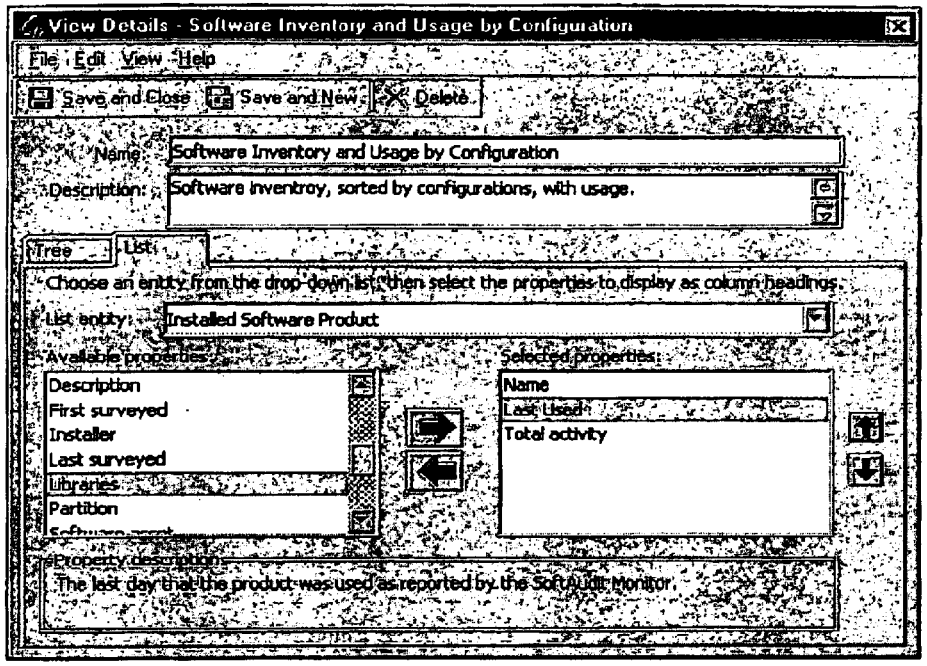
Figure 32B:
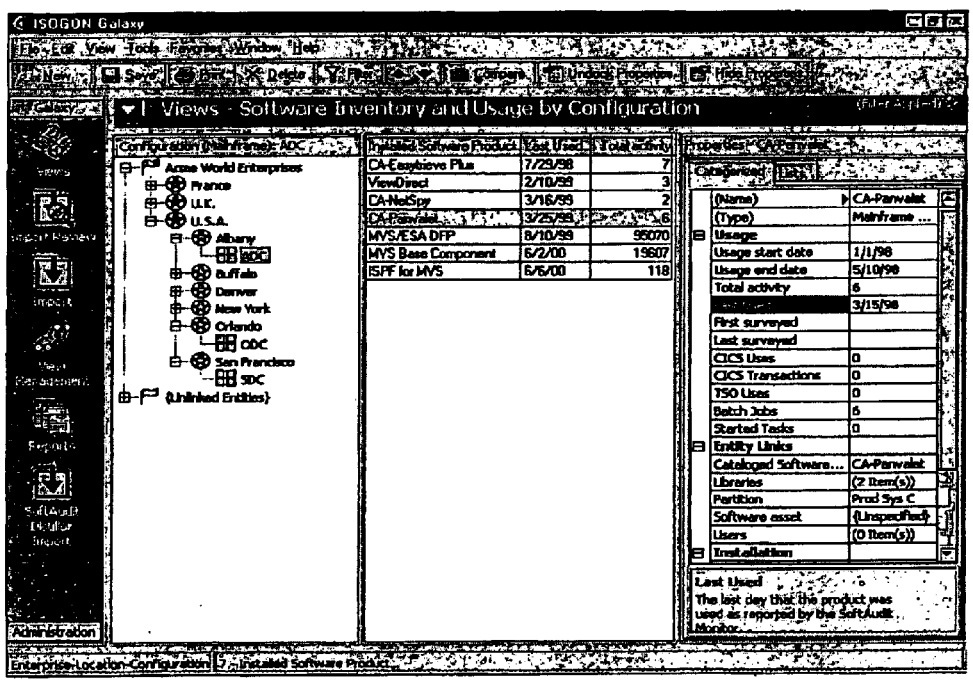

FIGS. 32A–32B show examples of the view management capability and a display of how such data is displayed.

Figure 33:
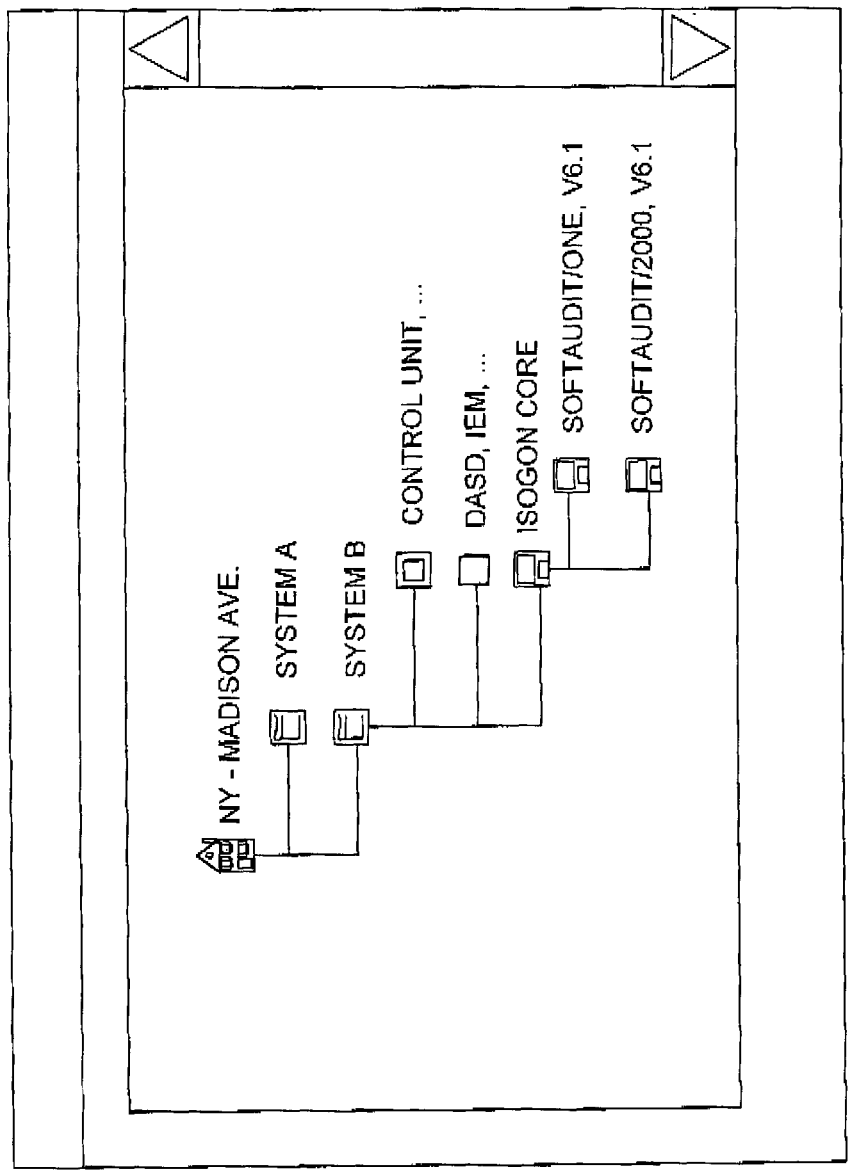

FIG. 33 shows a model computer screen.

DETAILED DESCRIPTION

Detailed Description of the Management Tool

Figure 1:
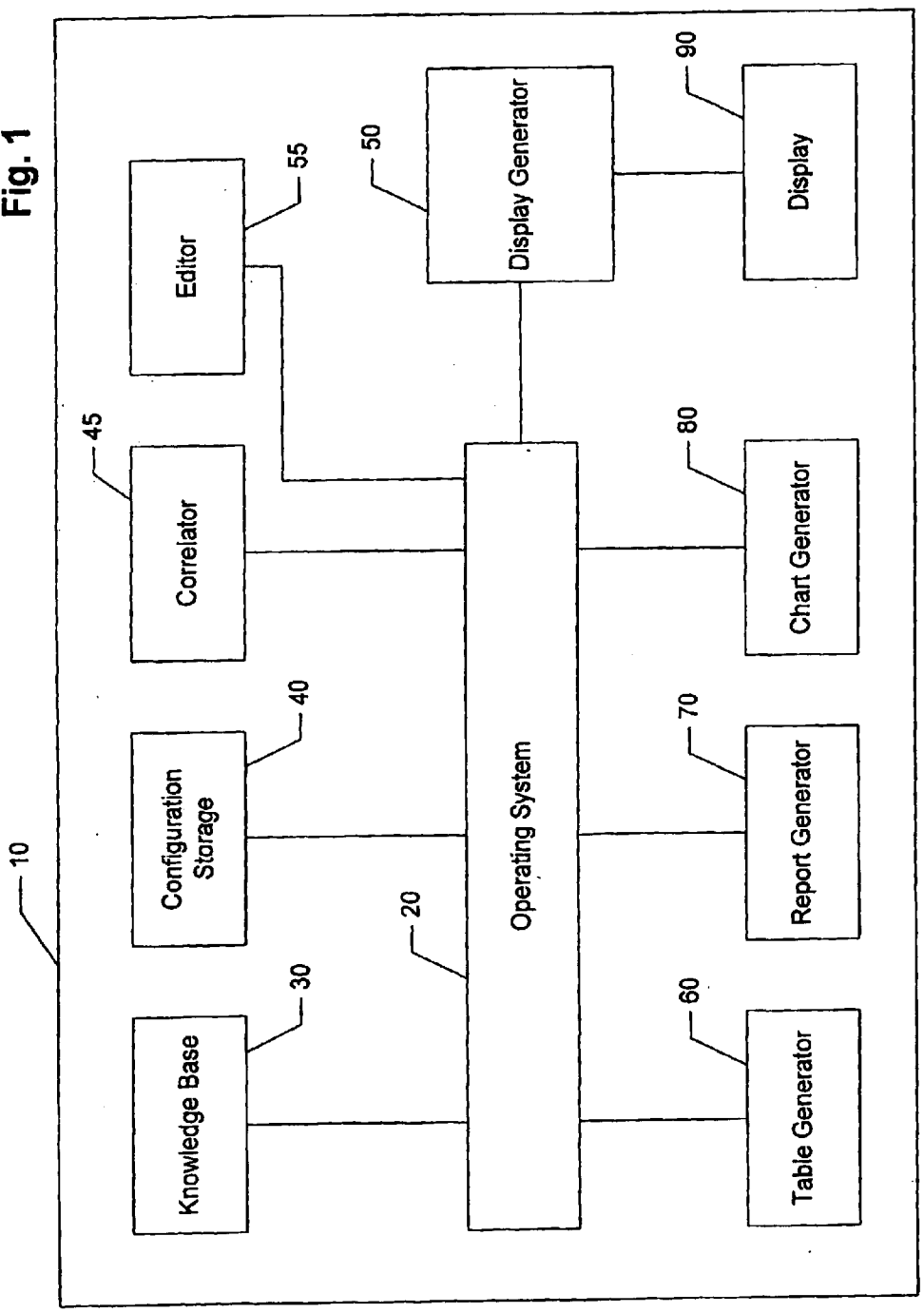
FIG. 1 is a block diagram showing a computer system in accordance with the present invention.

Referring first to FIG. 1, there is shown a computer system 10 in accordance with the invention with its various portions illustrated in block form. The computer system 10 includes an operating system 20, which may be a conventional operating system such as Windows 95, Window 98, Windows NT, or Windows 3.1X.

Also included are a knowledge base 30 for storing financial and technical information of various hardware devices and/or software products, a configuration storage 40 for storing one or more configuration trees representing existing and proposed configurations of the data centers, and a correlator 45 for correlating the financial and technical information stored in the knowledge base with the elements of the configuration trees for storage in the configuration storage. Further included are a table generator 60 for generating a table or grid displaying financial and summary information of one or more of the configurations or portions of configurations, a report generator 70 for generating a printed report of a configuration or a portion of a configuration, and a chart generator 80 for generating information generated by the table generator in graphic form. A display generator 50 generates a visual representation of, for example, part or all of a configuration stored in configuration storage 40 together with its associated information from the correlator 45 and the knowledge base 30 for a display 90. Additionally, grid information generated by the table generator 60 is formatted by the display generator 50. Alternatively, the representation of one or more charts generated by the chart generator 80 are formatted for display by the display generator.

Figure 2:
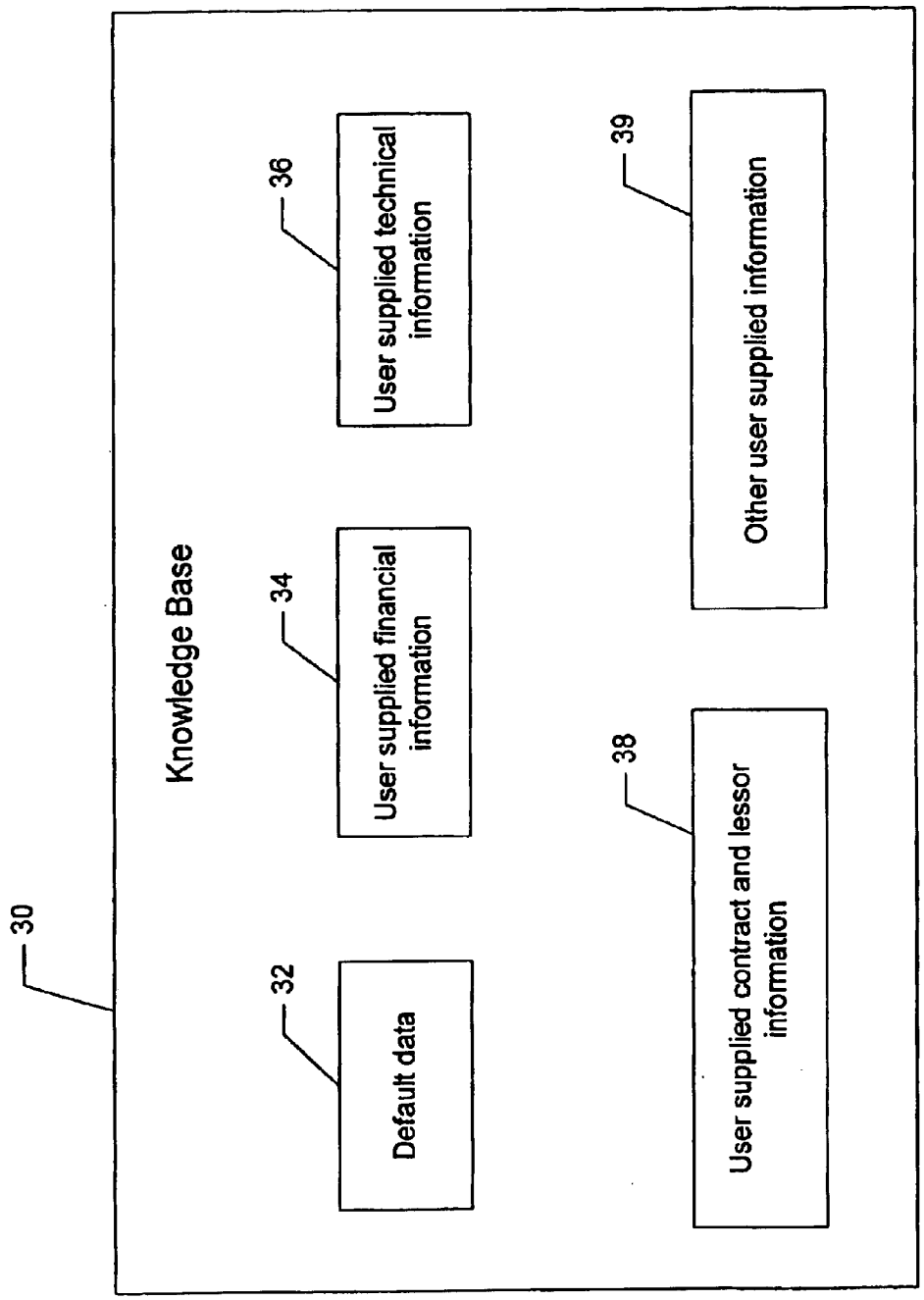
FIG. 2 is a block diagram showing the knowledge base of FIG. 1.

The knowledge base 30, shown in greater detail in FIG. 2, includes one or more databases of user supplied financial information 34 and user supplied technical information 36 of various devices. Also included in the knowledge base are user supplied contact and lessor information 38 for the devices and other user supplied information 39. Further included are default data 32 including financial and technical information of other devices not supplied by the user.

An editor 55, shown in FIG. 1, is included for modifying the user supplied information in the knowledge base and the configuration storage.

Figure 3:
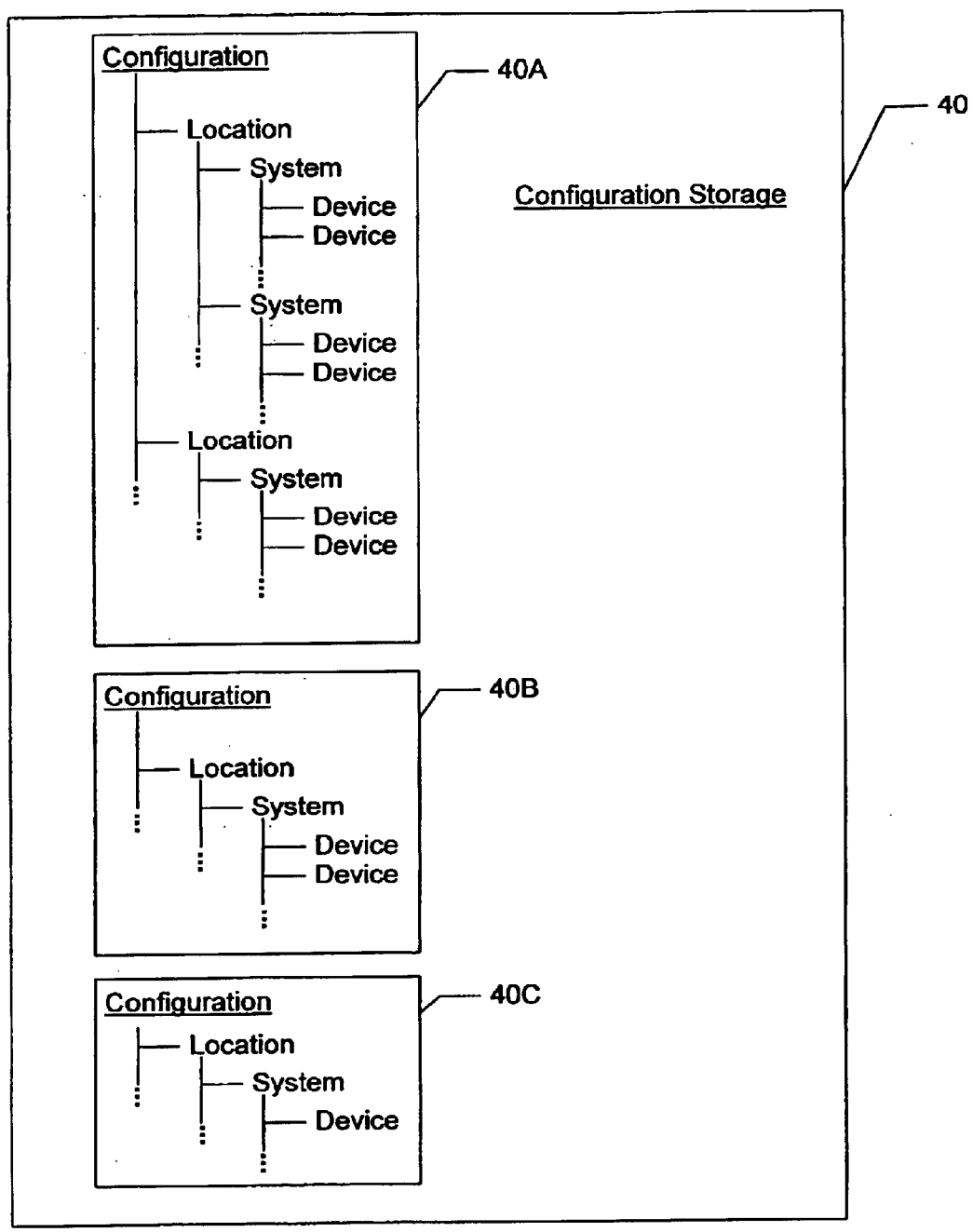
FIG. 3 is a block diagram showing the configuration storage of FIG. 1.

FIG. 3 shows, in greater detail, the configuration storage 40 which is comprised of one or more configurations 40A, 40B, 40C, . . . Each configuration includes at least one data center location having at least one system which, in turn, includes at least one device group. Each device group, in turn, includes one or more devices. The configuration is stored in a tree data structure in which the highest level represents the respective configuration, the second level of the tree represents the data center locations within the configuration, the third level represents the systems within a respective location, the fourth level of the data structure represents the device groups within a respective system, and the fifth level represents the devices under a respective device group.

Figure 4A:
FIGS. 4A–4E show an example of the respective levels of a configuration stored in the configuration storage of FIG. 3.
Figure 4B:
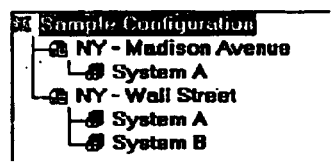
Figure 4C:
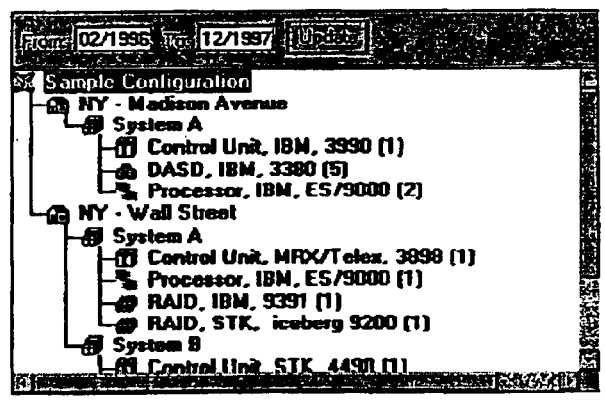
Figure 4D:
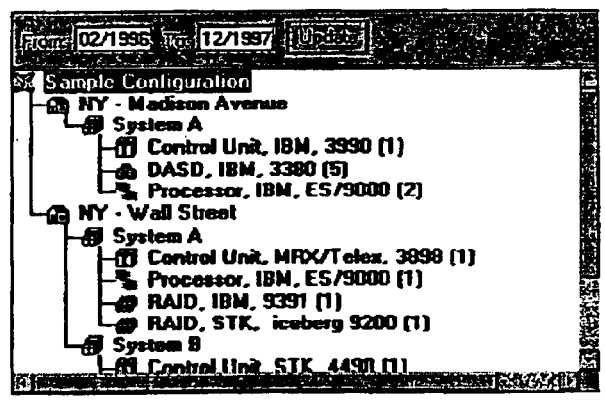
Figure 4E:
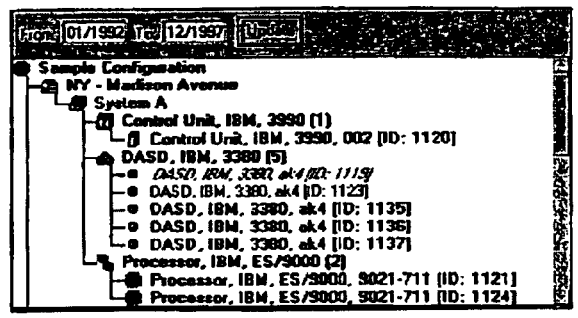

FIGS. 4A–4E show an example of a display of the respective levels of a configuration tree that are generated by the display generator 50. FIG. 4A shows a representation of the first level, namely the configuration, which is called in this example the Sample Configuration. FIG. 4B shows a representation of the first and second levels of the example, namely two data center locations within the Sample Configuration. FIG. 4C shows the first through third levels which includes the respective systems of each of the two locations, and FIG. 4D shows the first through fourth levels which may include, for example, a control unit, a DASD, a processor and a RAID. FIG. 4E shows the first through fifth levels which includes the respective devices of each device group. In accordance with the invention, the display generator 50 may be instructed to generate a display of between one to all five of the configuration tree levels, as shown in FIGS. 4A–4E.

Figure 5:
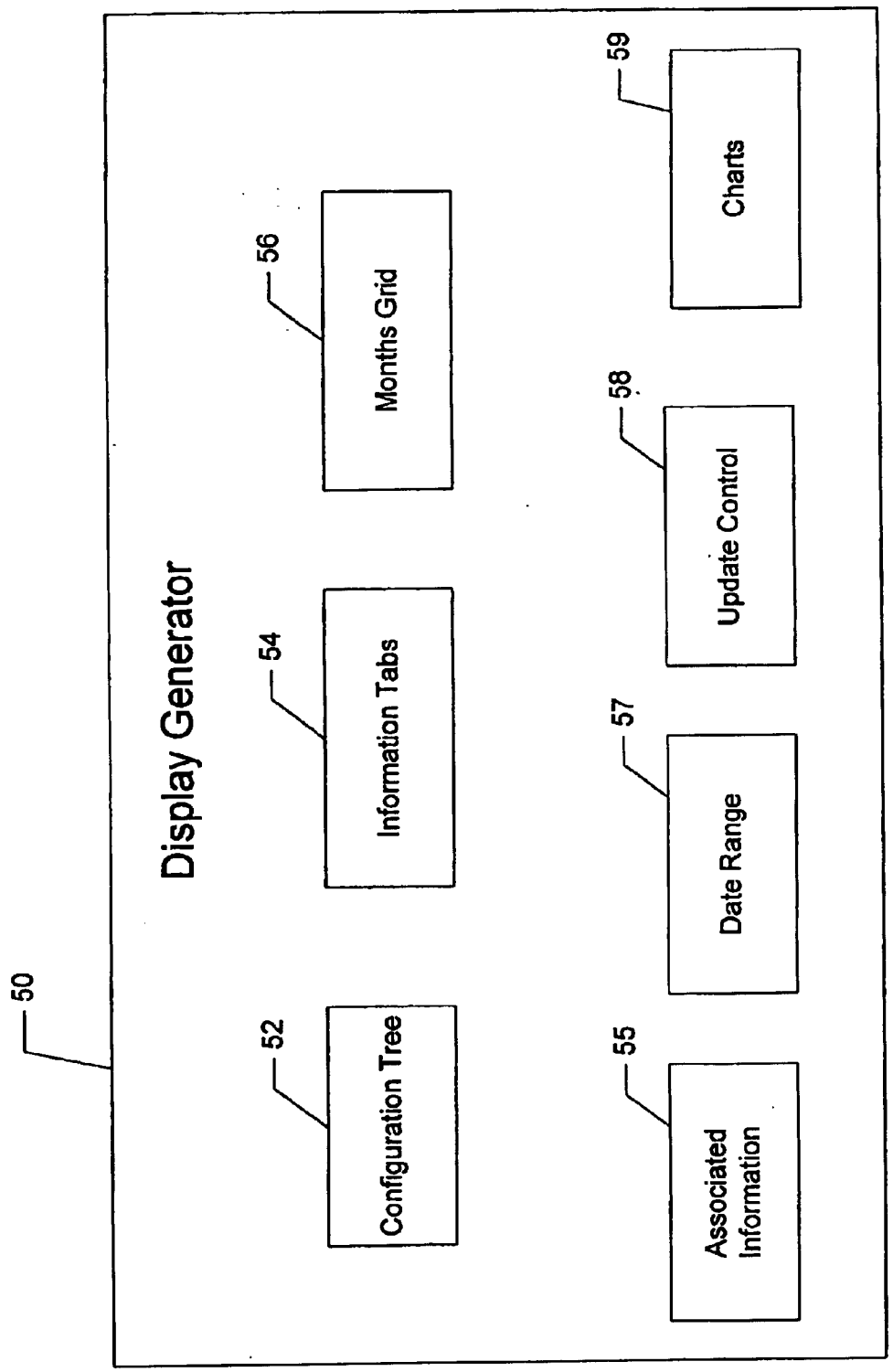
FIG. 5 is a block diagram showing the display generator of FIG. 1.
Figure 6:
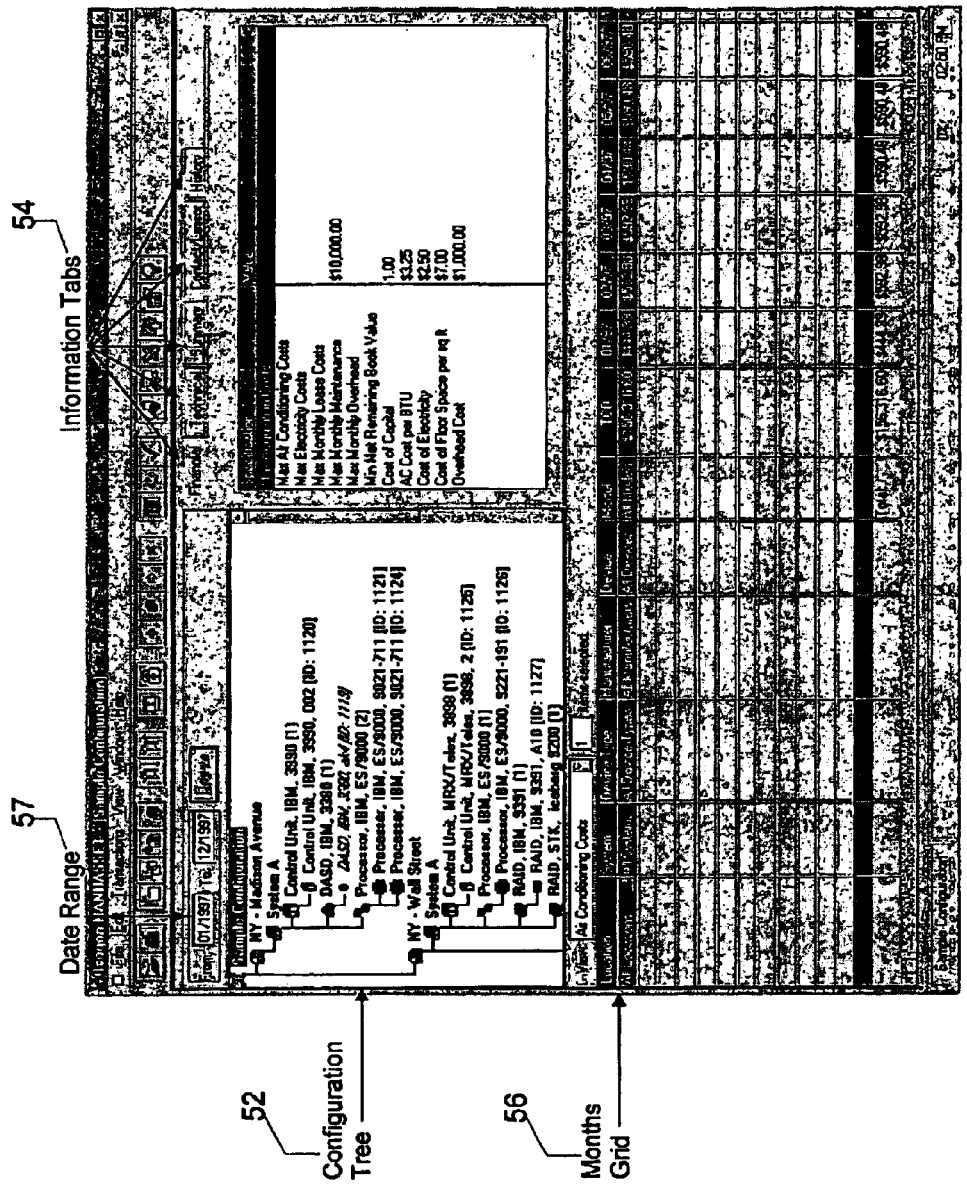
FIG. 6 shows an example of a display generated by the display generator of FIG. 5.

FIG. 5 shows a block representation of the display generator 50 in greater detail. The display generator generates a representation of part or all of a configuration tree 52, together with selected portions of its associated information 55, over a date range 57. FIG. 6 illustrates an example of a display generated by the display generator 50.

Figure 7:
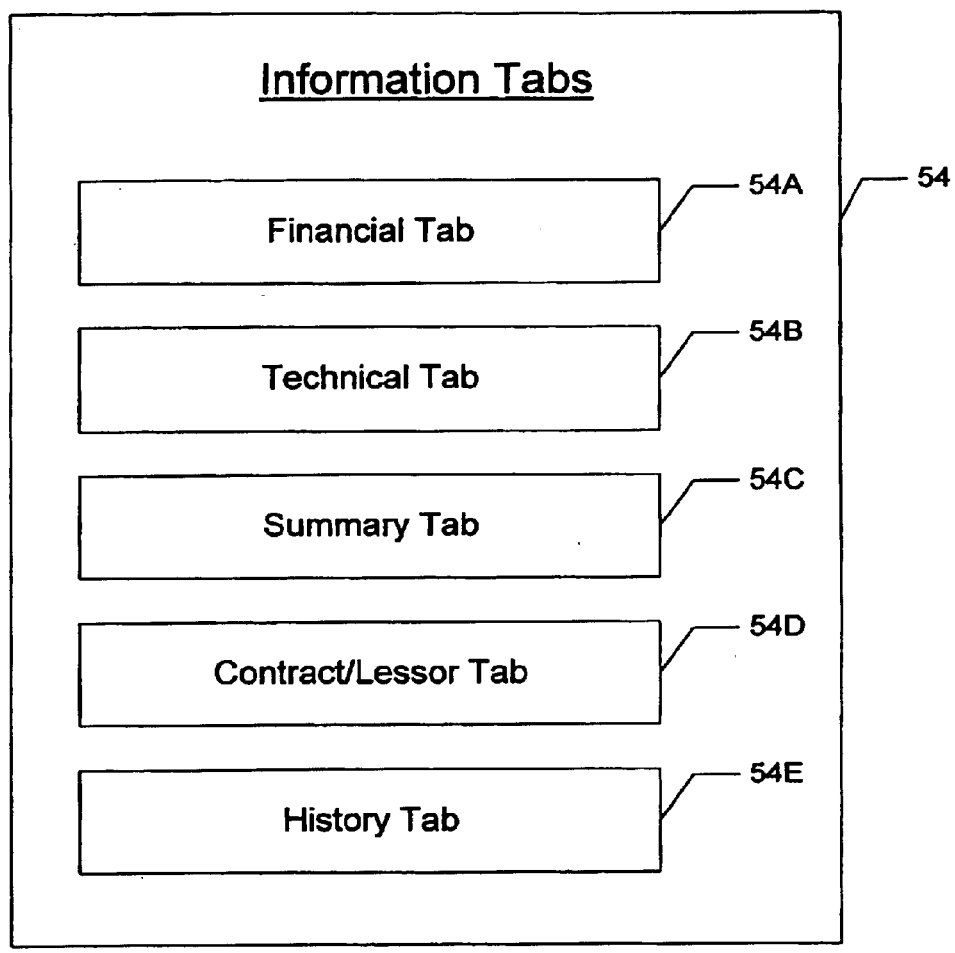
FIG. 7 is a block diagram showing the information tabs data of the display generator of FIG. 5.

The display generator 50 may also incorporate a months grid 56 which may display financial information or summaries of financial information of one or more locations, systems, device types, manufacturers, devices, and models over a selected number or months as well as the total cost of ownership (TCO) and the totals. Additionally, the display generator generates information tabs 54, shown in greater detail in FIG. 7, which include a financial tab 54A showing that financial information is being displayed, a technical tab 54B showing that technical information is being displayed, a summary tab 54B showing that summary information is being displayed, a contact/lessor tab 54D or a history tab 54E.

FIGS. 8A–8B, 9A–9B, and 10A–10C, show examples of displays generated by the display generator 50 when one of the information tabs 54 is selected for a respective element in a configuration tree.

Figure 8A:
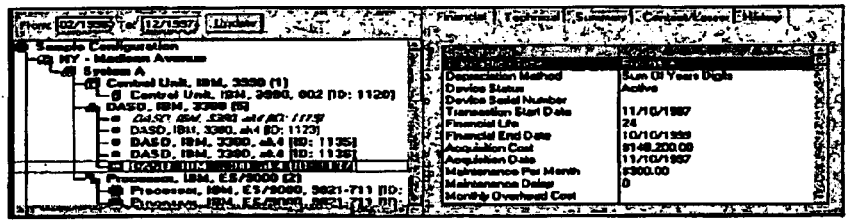
FIGS. 8A–8B shows an example of the financial specifications displayed when the financial tab of the information tabs of FIG. 7 is selected.
Figure 8B:
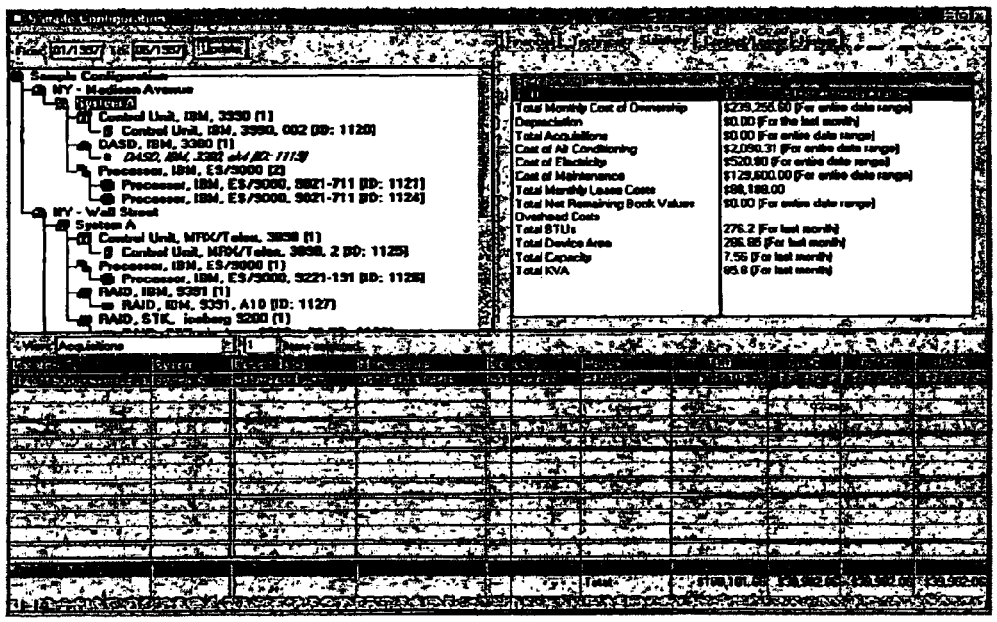

FIG. 8A shows an example where the financial tab 54A is selected for a respective device in the configuration tree. Alternatively, the financial specifications of a respective device group, system, location or of an entire configuration may be selected. As an example, FIG. 8B shows the financial specifications of a respective system.

The financial information for a respective configuration may include the cost of capital or cost of money, the air conditioning costs per BTU, the cost of electricity based on a per KVA basis, the cost of floor space per square foot, and/or the monthly overhead cost.

The financial specifications for a data center location may include its cost of capital, if different from that of the entire configuration, the air conditioning cost per BTU, if different from that of the configuration, the cost of electricity, if different from that of the configuration, the cost of floor space per square foot, if different from that of the configuration, the monthly overhead cost, and/or the total floor space.

The system level financial specifications include the air conditioning cost per BTU, if different from that of the configuration of the respective data center, and the overhead costs.

The device level financial specifications include the acquisition date, the maintenance per month, the maintenance delay, the monthly overhead costs, the financial life, the transaction start date, the acquisition cost, the salvage value, the depreciation method (if the device is purchased), the monthly lease cost and lease buyout cost (if the device is leased), the remaining book value, the device serial number, the order date, the delivery date, the installation date and the invoice date.

Figure 9A:
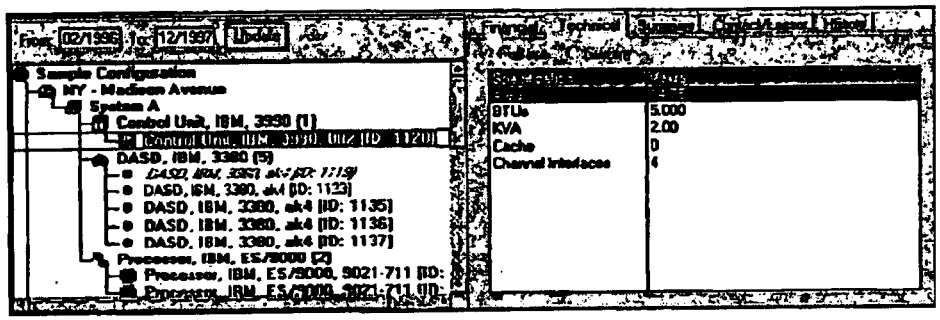
FIGS. 9A–9B shows an example of the technical specifications displayed when the technical tab of the information tabs of FIG. 7 is selected.
Figure 9B:
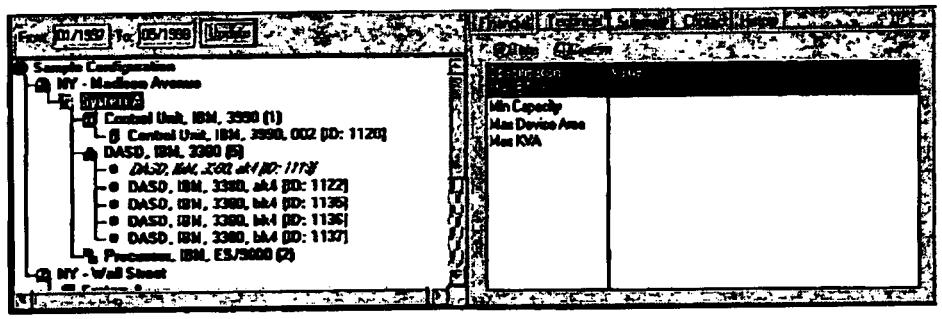

FIGS. 9A–9B show examples of displays generated by the display generator 50 when the technical tab 54B is selected. Specifically, FIG. 9A shows an example of the technical information of a respective device in the configuration tree, and FIG. 9B shows an example of the technical information of a system.

The technical information of a device may include the device type, the device manufacturer, the device model number, the device serial number, the area used, the BTUs, and the power consumed in KVA. If the device is a DASD, the technical information may also include the capacity per unit, the number of cylinders per device, the data transfer rate, the number of physical device addresses per unit, and the number of tracks per cylinder. For a RAID, the technical information may also include the capacity per unit, the logical device addresses, the cache, the number of ESCON channels, the number of logical channels, and the number of OEMI host adapters. For a control unit, the technical information may also include the cache and the number of channel interfaces.

The technical specifications of a device group, system, location or configuration may also include totals of some or all of the above information.

Figure 10A:
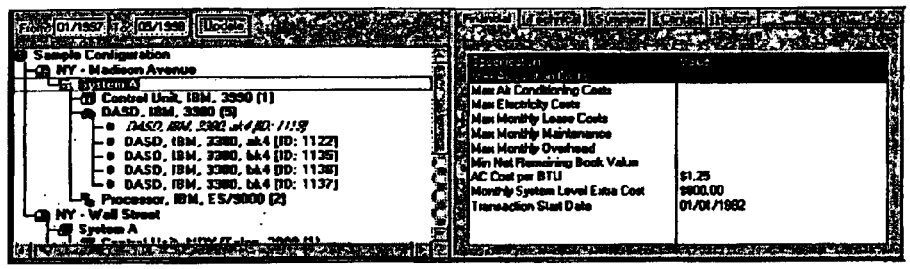
FIG. 10A shows an example of the summary, technical and financial specifications that are displayed when the summary tab of the information tabs of FIG. 7 is selected.

FIG. 10A shows an example of a display generated by the device generator 50 which shows a summary of the technical and financial specifications of a respective system. Alternatively, summary information of a configuration, or of one or more locations, systems or devices are shown.

Figure 10B:
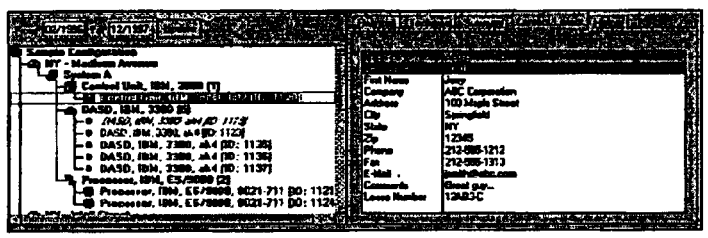
FIG. 10B shows the contact and lessor information displayed when the contact/lessor tab of the information tabs of FIG. 7 is selected.

FIG. 10B shows an example of a display generated by display generator 50 which shows the associated contact and lessor information of a device when the contact/lessor tab 54D is selected.

Figure 10C:
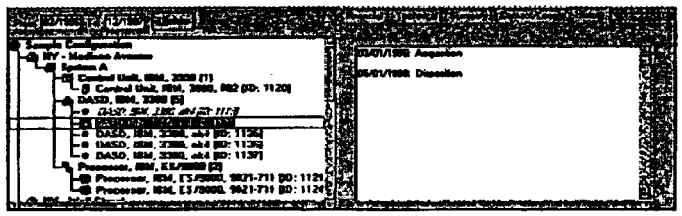
FIG. 10C shows the history data displayed when the history tab of the information tabs of FIG. 7 is selected.

FIG. 10C shows an example of a display generated by the display generator 50 when the history tab 54E is selected and shows the history of a respective device.

Referring back to FIG. 1, the table generator 60 generates a table displaying the technical information about selected levels of a configuration tree which, in turn, is formatted by the display generator 50 for display as the months grid 56.

Figure 11A:
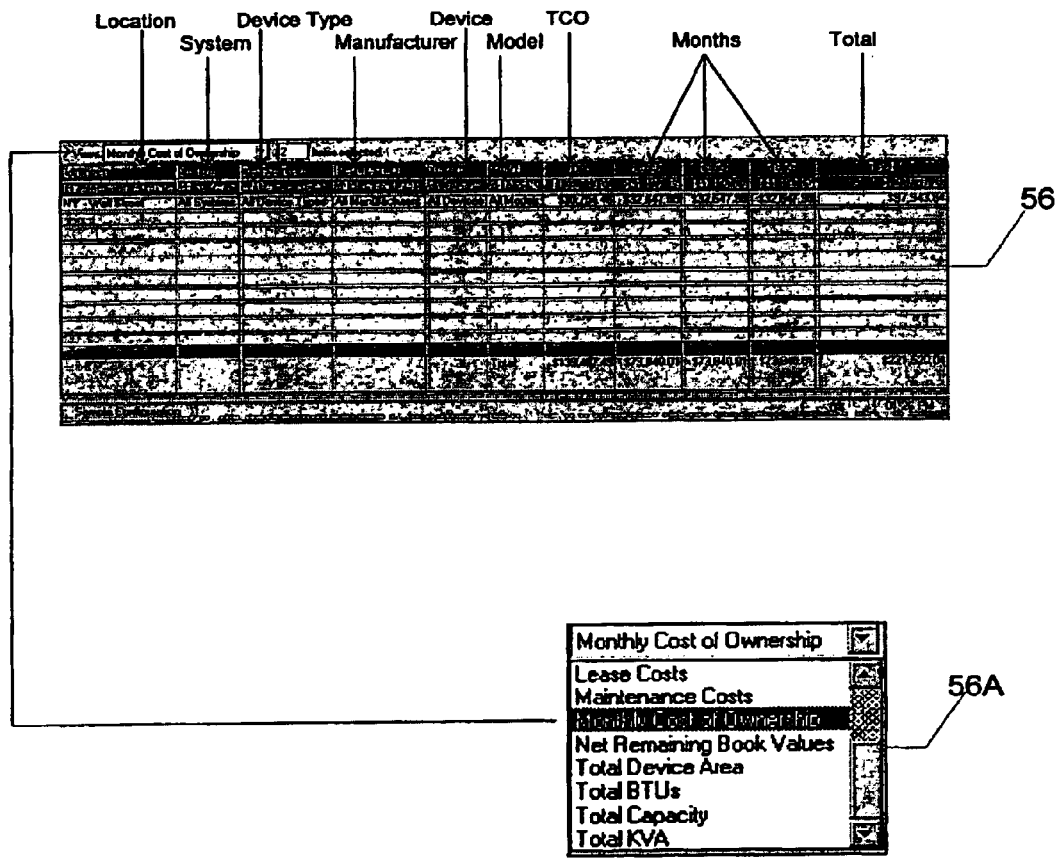

FIG. 11A shows an example of a representation of a months grid 56 which shows one or more locations, systems, device types, manufacturers, devices, models, TCOs, the monthly cost of ownership over three respective months and the total cost of ownership. Also shown are the totals for the two locations.

Figure 11B:
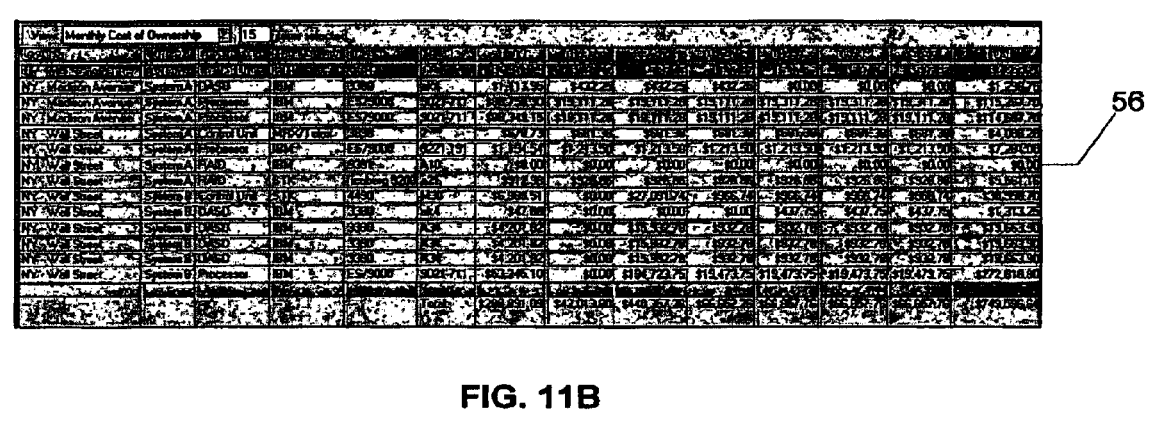

It should be noted that other information, such as the lease costs, maintenance costs, overhead costs, net remaining book value, total device area, total BTUs or total capacity may be shown as set out in box 56A. The months grid 56 generated by table generator 60 and display generator 50 may display specific information pertaining to a date range as a function of one or more months over any level of the configuration tree. The months grid may also be used to show comparisons between respective devices, systems or locations. As an example, FIG. 11B shows a representation of a months grid 56 that breaks out the monthly cost of ownership by device.

The respective locations, systems, device types, and devices that are selected for comparison in the months grid are selected from the configuration tree generated for display by the display generator 50, such as is shown in FIG. 6, and the criteria used for comparison may be selected from the criteria shown in box 56A of FIG. 11A.

Figure 12:
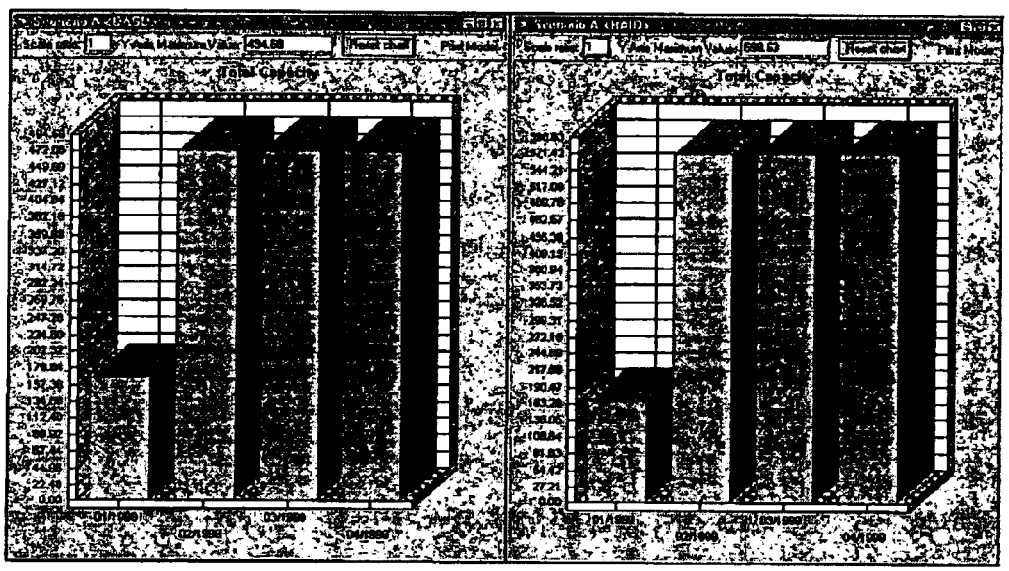
FIG. 12 shows an example of a chart generated by the chart generator of FIG. 1.

A graphic representation of the information continued in months grid 56 may be generated by the chart generator 80 and formatted by the display generator 50. FIG. 12 shows an example of a bar chart generated by the chart generator 80 and the display generator 50. Alternatively, stack charts, pie charts or other types of charts may be generated. It should be noted that charts representing information concerning one or more devices, device types, systems, locations or configurations may be displayed concurrently.

Figure 24A:
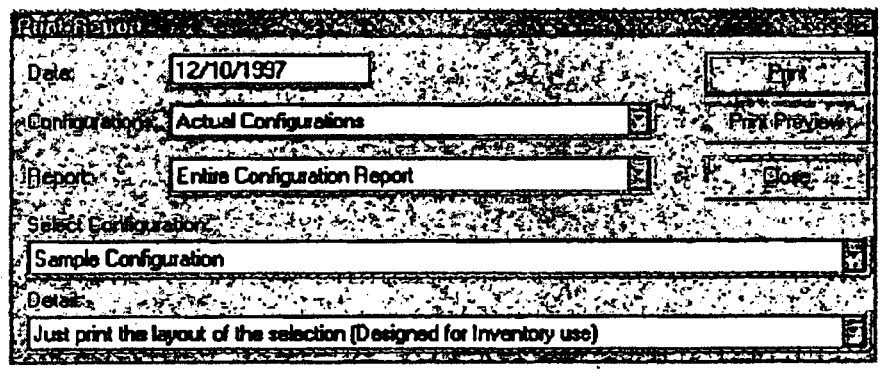
FIGS. 24A and 24B show examples of a displayed representation of the operation of FIG. 24A.
Figure 24B:
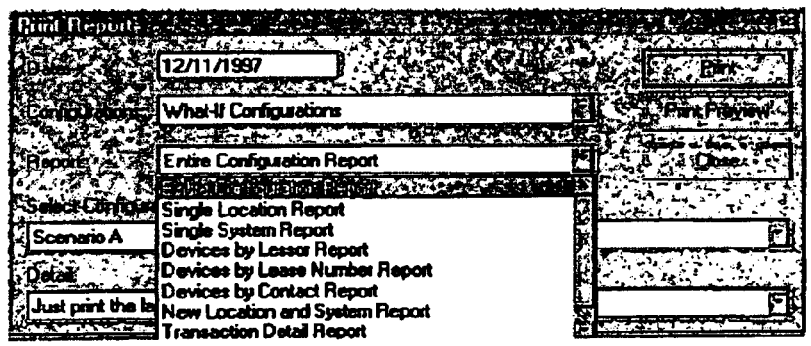

The report generator 70 shown in FIG. 1 generates reports of selected degrees of detail which may be either printed out or formatted for display by the display generator 50. FIGS. 24A and 24B illustrate an example of a print report request. Each requested report begins from a first date in which the devices were acquired up to a specified date for an actual or a proposed configuration. The type of report is also selected and may cover an entire configuration, a single location, a single system, the devices by lessor, the devices by lease number, the devices by contract, new location and system, transaction detail, or a shopping list. The name of the configuration and/or location is also selected as well as the degree of detail.

A report of an entire configuration provides information about the configuration and includes all locations, systems and devices in the configuration. A report of a single location provides information about the configuration and the location and includes all systems and devices within the location. A single system report provides information about the configuration, location and the system and includes all devices in the system. A "devices by lessor" report provides information about all leased devices by a specified lessor and shows information about all locations and systems where such devices are installed. A "devices by lease number" report provides information about all leased devices belonging to a selected lease number and shows information about all locations and systems where such devices are installed. A "devices by contract" report provides information about all purchased devices based on a selected contact and shows information about all systems and locations where such devices are installed. Other reports are also possible.

A new location and system report provides information about new locations and systems that have been added to a proposed ("What-If") configuration. A transaction detail report provides a chronological list of all transactions created while preparing a proposed configuration. A shopping list report provides a list of all transactions within the What-If configuration that are different from the actual configuration. Advantageously, this report specifies the devices that must be added, disposed, renegotiated or moved to change an actual configuration to a What-If configuration.

The editor 55, shown in FIG. 1, stores, retrieves and edits contact information, changes the requirements and specifications of any item within a configuration, and deletes a transaction with the configuration storage 40. The editor also enables custom modification to the knowledge base 30.

Custom modifications to the knowledge base include adding a manufacturer, adding a device, adding a model, modifying and adding information about a device, creating an additional set of customer specifications for a respective device, changing the set of specifications that is defined as the default set, adding information about RAID devices, and adding or removing a custom specification of a RAID device. Throughout the instant specification, "device" or "element" refers to either hardware components, assemblies, products, etc. and/or to software products.

The knowledge base 30 is also periodically updated by information provided by a disk, online or in a CD-ROM.

In addition to storing and displaying information concerning an existing configuration, the invention enables the simulation and optimization of changes to existing configurations. Editor 55 and the display generated by the display generator 50 are used to create a new location or system, add device levels and devices, update financial and technical information, move devices, and dispose of devices as specified by a user. The editor 55 and the display generated by the display generator 50 also allow for the creation of proposed or "What-If" configurations.

Figure 13A:
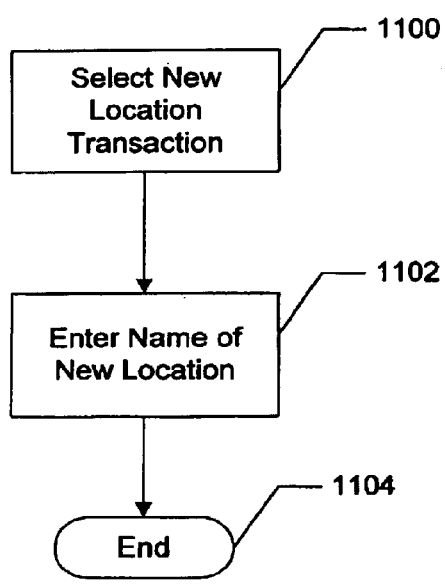
FIG. 13A is a flow chart illustrating the flow of a Select New Location transaction.
Figure 13B:
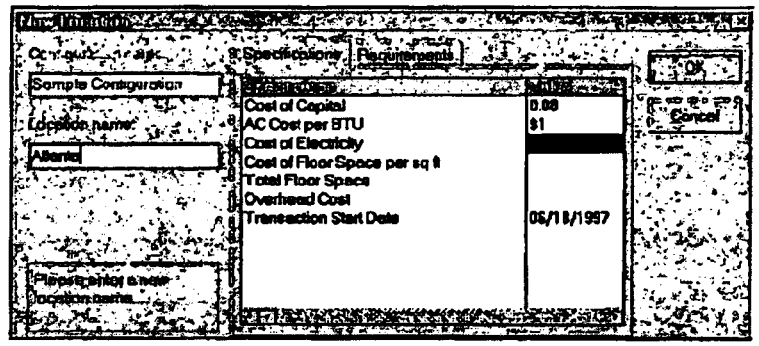
FIG. 13B illustrates an example of a displayed representation of a Select New Location transaction.

FIG. 13A shows a flow chart of a transaction for creating a new location within a configuration. First, a Select New Location transaction is selected at step 100, such as by selecting a menu item on the display generated by the display generator 50 and as shown in FIG. 6, for example. Then, the name of the new location is entered at step 102. FIG. 13B shows an example of a display of a new location with its specifications.

Figure 14A:
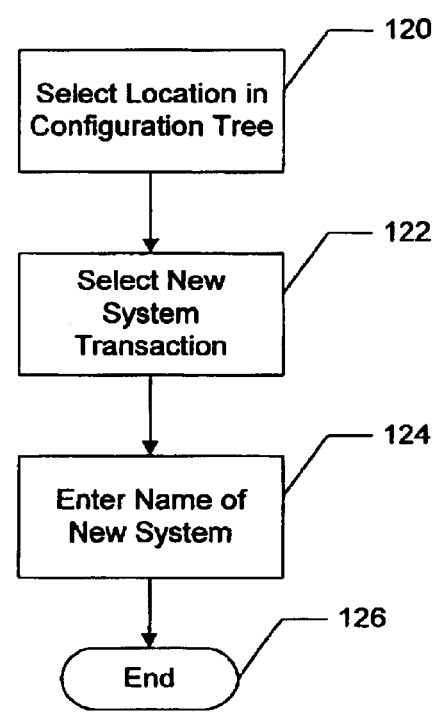
FIG. 14A is a flow chart illustrating the flow of a Select New System transaction.
Figure 14B:
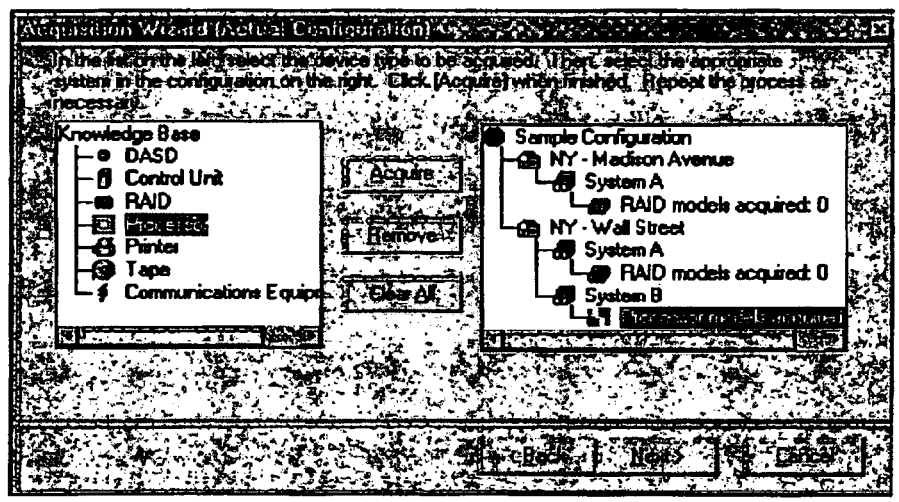
FIG. 14B illustrates an example of a display of a Select New System transaction.

FIG. 14A shows a flow chart which describes the flow of a transaction for adding one or more systems to a respective location. First, a respective location is selected from the configuration tree at step 120, and a New Systems transaction is selected at step 122. The name of the new system is then entered at step 124. FIG. 14B shows an example of a display showing the acquisition of a device. Here, a processor has been selected from the knowledge base and has been added to System B at the NY-Wall Street location in the configuration.

Figure 15A:
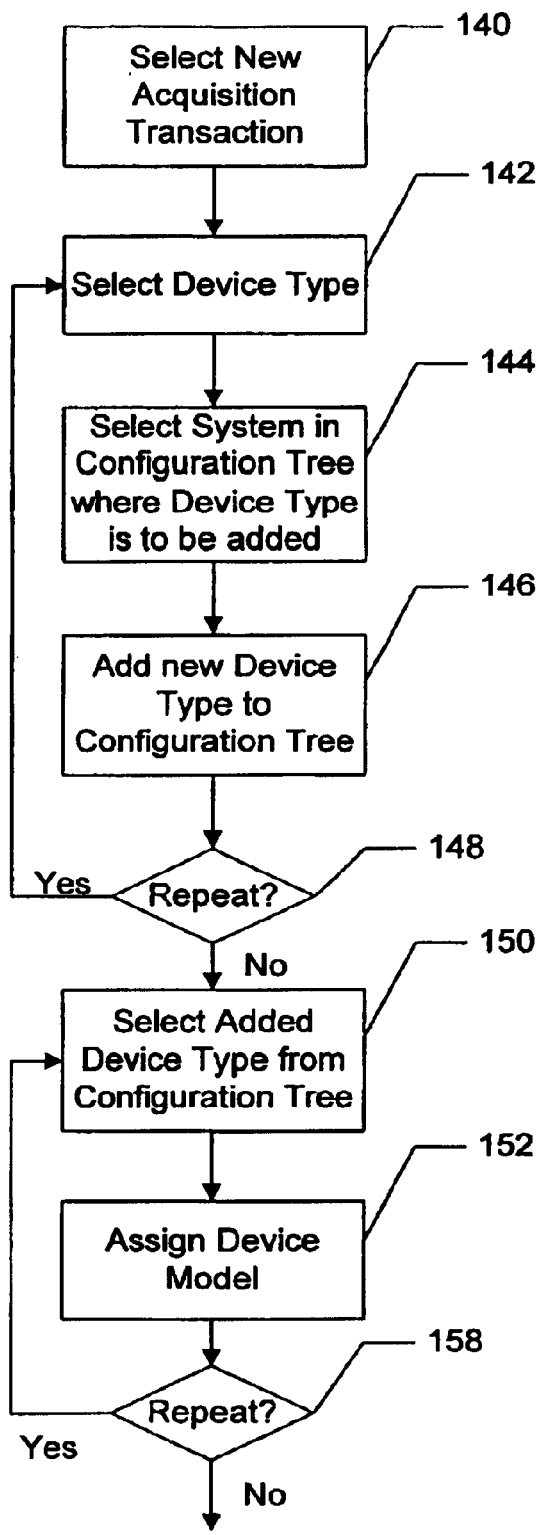
FIGS. 15A–15B are flow charts illustrating the flow of a Select New Acquisition transaction.
Figure 15B:
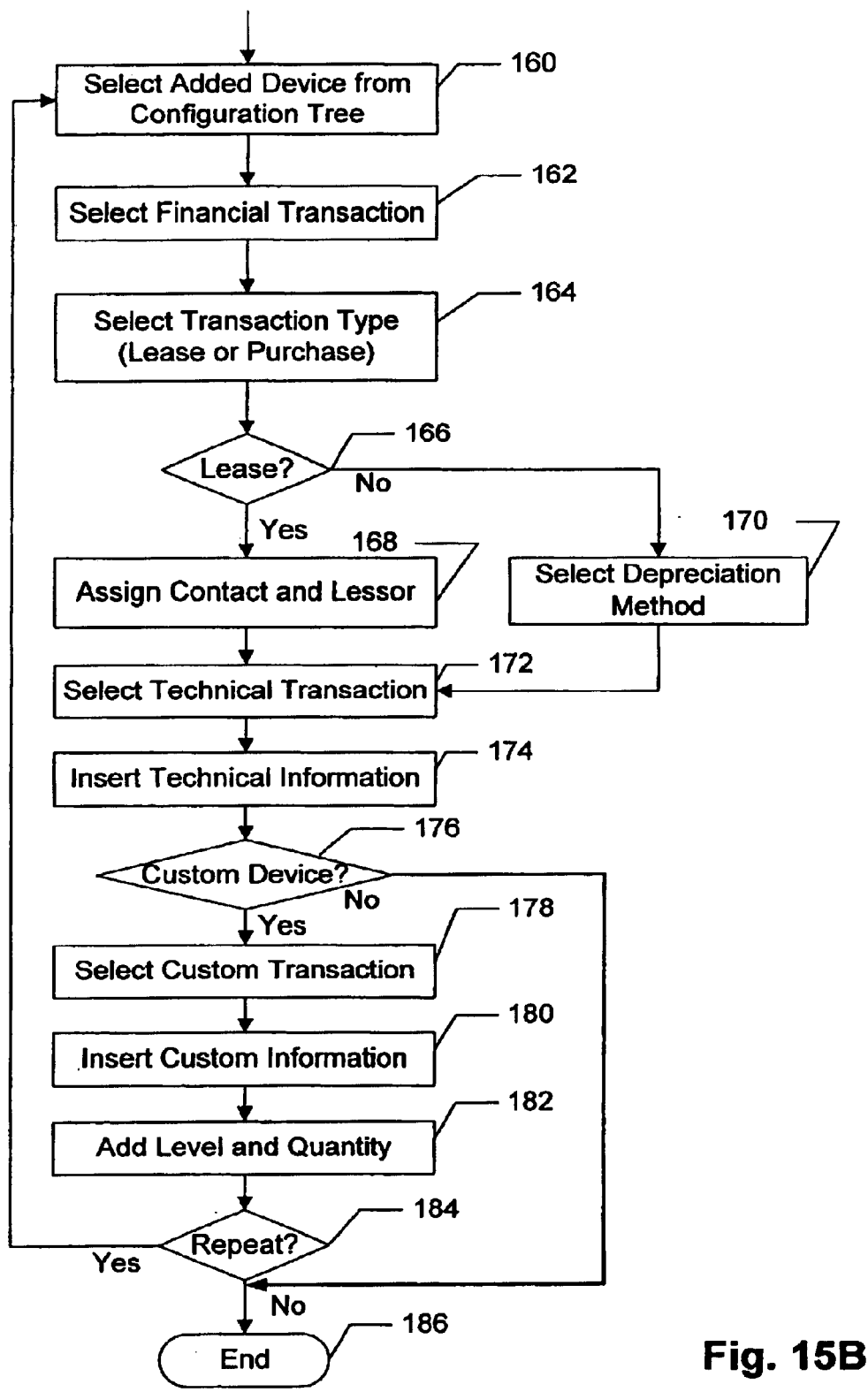
Figure 16A:
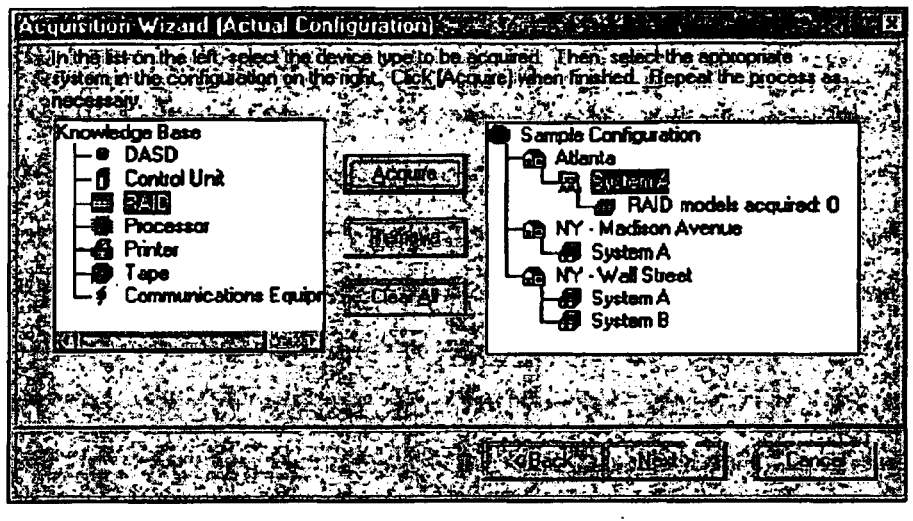
FIGS. 16A–16G show examples of displayed representations of several of the steps of FIGS. 15A–15B.

FIGS. 15A–15B are flow charts showing the transactions for adding a device and its associated information. At step 140 of FIG. 15A, a New Acquisition transaction is selected. Then, at step 142, a device type is selected from the knowledge base and at step 144, a system is selected in the configuration tree where the device type is to be added. The new device type is added to the configuration tree at step 146. If desired, steps 142, 144 and 146 may be repeated for adding other device types at step 148. FIG. 16A shows an example where a processor was selected from the knowledge base and added to a configuration.

Figure 16B:
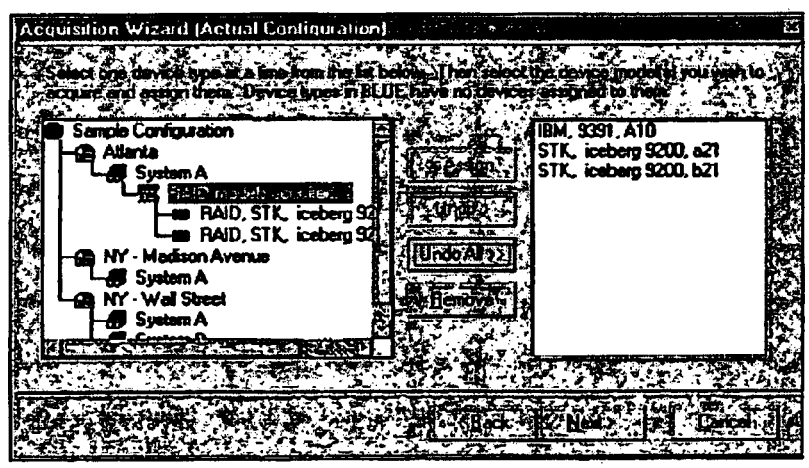

Thereafter, one of the newly added device types is selected from the configuration tree at step 150, and a device model is assigned to the newly added device at step 152. As step 158 shows, steps 150 and 152 are repeated for each newly added device. FIG. 16B shows an example with two newly added device types.

Figure 16C:
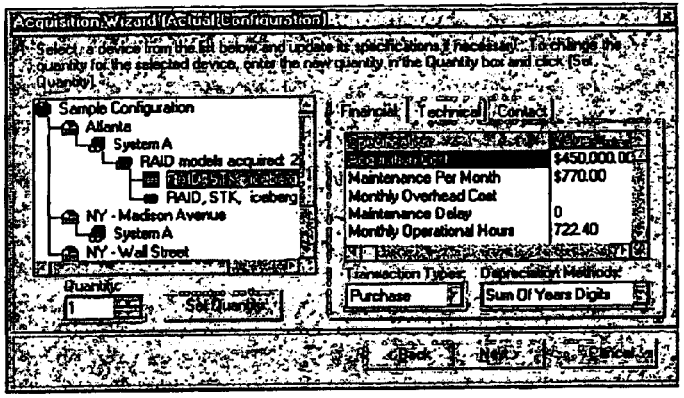
Figure 16D:
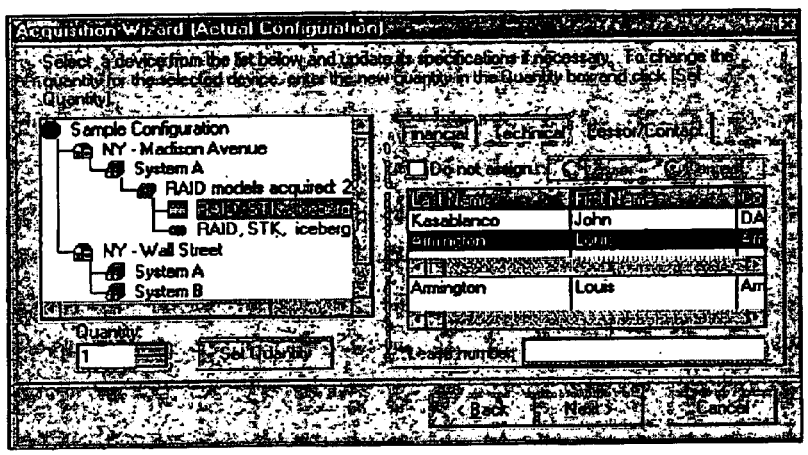

The associated information for each newly added device is then entered. At step 160 of FIG. 15B, one of the newly added devices is selected from the configuration tree. Then, at step 162, the financial tab is selected so that financial information is included. A transaction type, namely either the lease or purchase of a new device, is selected at step 164. If the device is leased, as step 166 shows, a contact and lessor are entered at step 168. Alternatively, if the device is purchased, a depreciation method is selected at step 170. FIG. 16C shows an example where financial information has been entered for a newly acquired RAID device. FIG. 16D shows an example where the names of contacts have been entered for the newly acquired device.

Figure 16E:
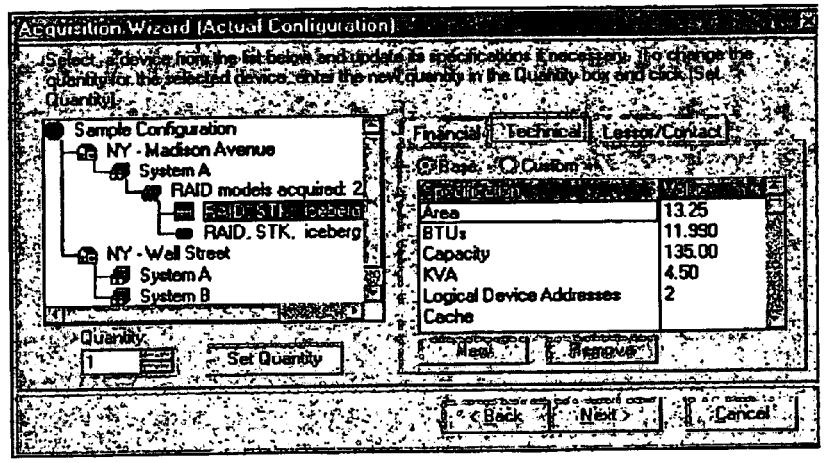

The technical tab is selected at step 172 so that technical information for the newly added device may be entered at step 174. FIG. 16E shows an example where the technical information is added for a newly acquired RAID device. It should be noted that the technical information may alternatively be added before the financial information.

Figure 16F:
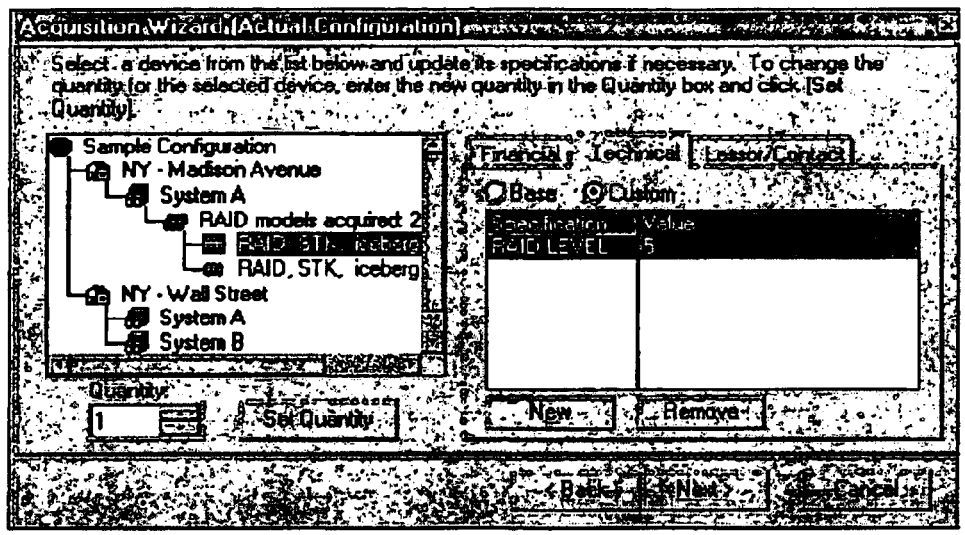
Figure 16G:
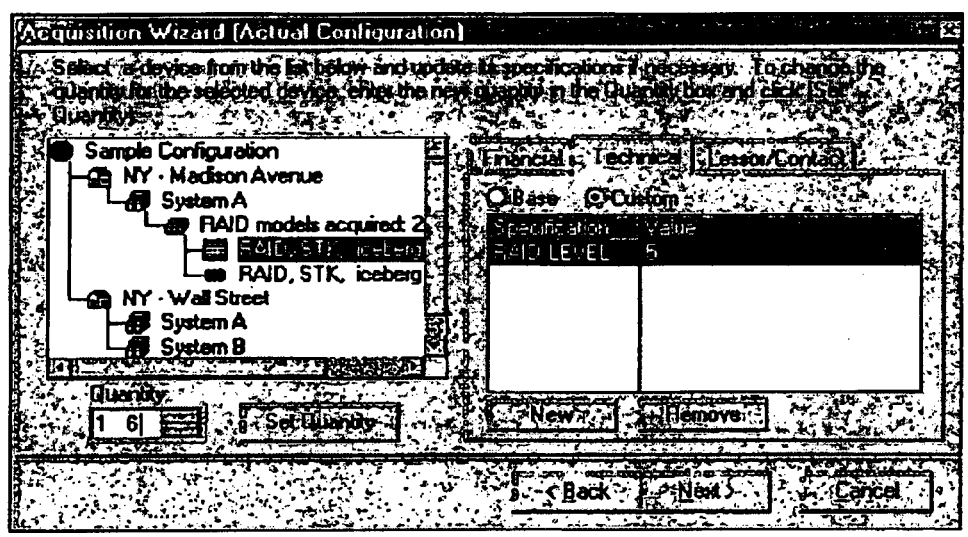

Then, if the newly added device includes custom in-house or manufacturer provided modifications, as shown at step 176, the custom option is selected at step 178. Custom information is then added at step 180. For example, for a RAID device, the RAID level field and its corresponding quantity are added at step 182. FIG. 16F and 16G show examples of such transactions.

Steps 160 to 182 may then be repeated for each newly added device at step 184.

Figure 17:
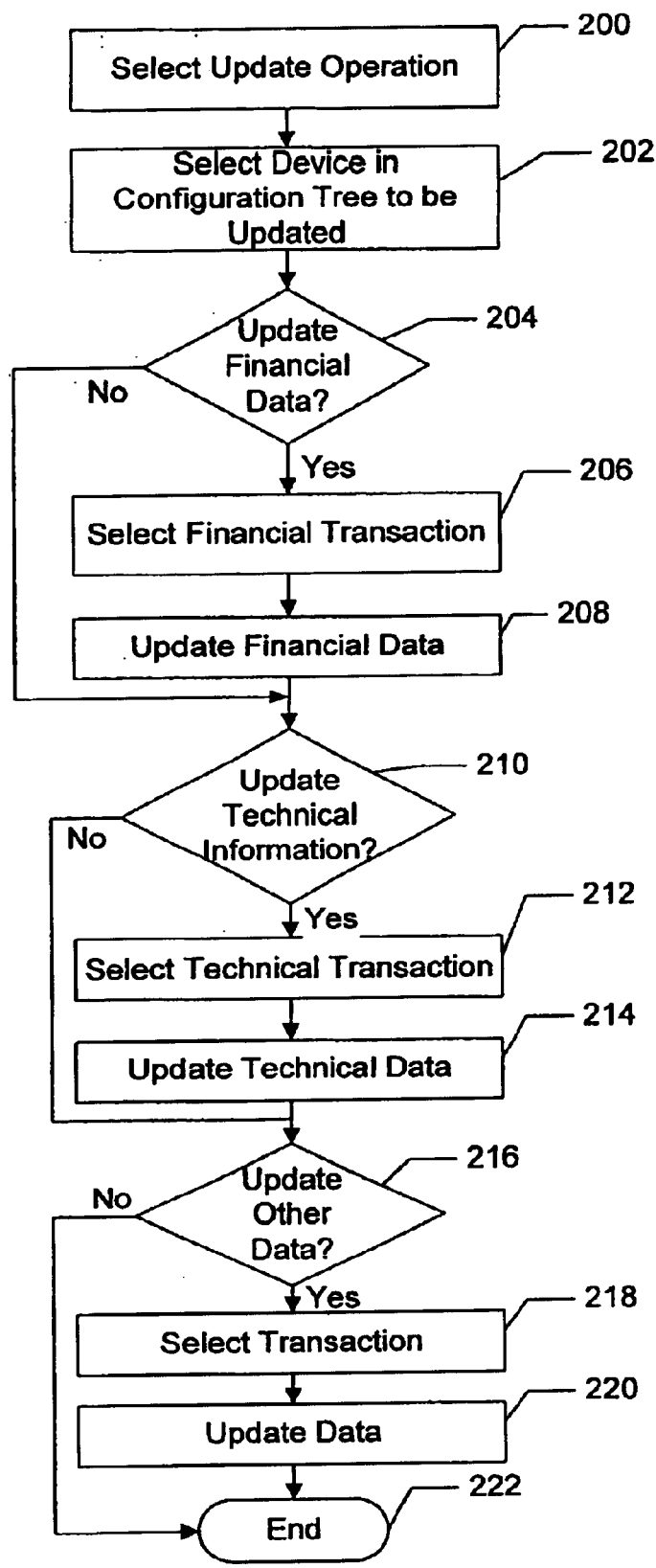
FIG. 17 is a flow chart illustrating the flow of an Update operation.
Figure 18A:
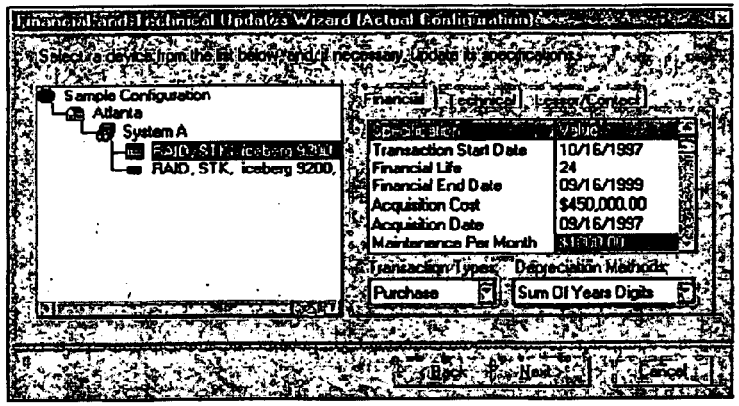
FIGS. 18A–18C show examples of displayed representations of steps in the operation of FIG. 17.

FIG. 17 is a flow chart illustrating the steps for updating financial and technical information. First, the Update Operation is selected at step 200, and the device in the configuration tree for which the technical and/or financial information is to be updated is selected at step 202. If the financial data is to be updated, as shown at step 204, the financial tab is selected at step 206, and updated financial data is then entered at step 208. FIG. 18A shows an example where the maintenance per month amount has been updated for a RAID device.

Figure 18B:
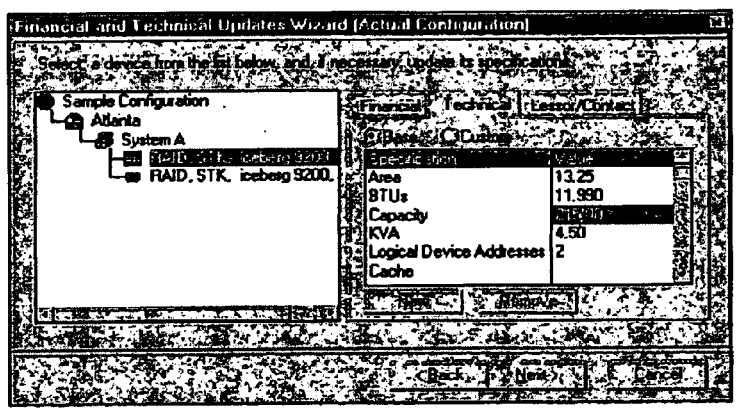

When technical information is to be updated, as step 210 shows, the technical tab is selected at step 212, and the technical data is then updated at step 214. FIG. 18B shows an example where the capacity of a RAID device is updated. The technical information may instead by updated prior to the financial information.

Figure 18C:
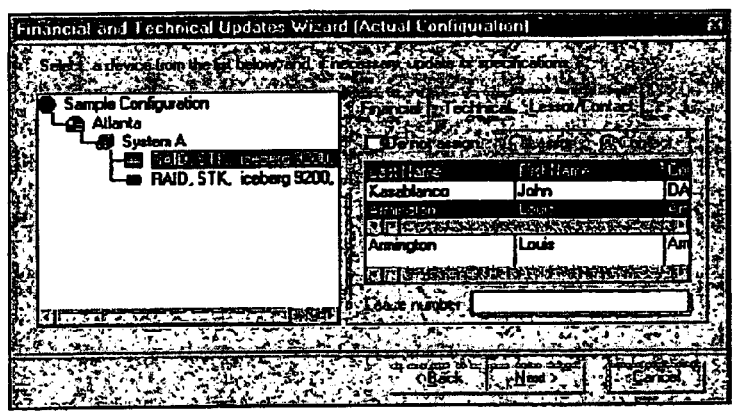

Other data may then be updated, as shown at step 216. The respective transaction is selected at step 218, and the data updated at step 220. FIG. 18C shows an example where the lessor/contact tab has been selected so that the contact information for a RAID device of the configuration is changed.

Figure 19:
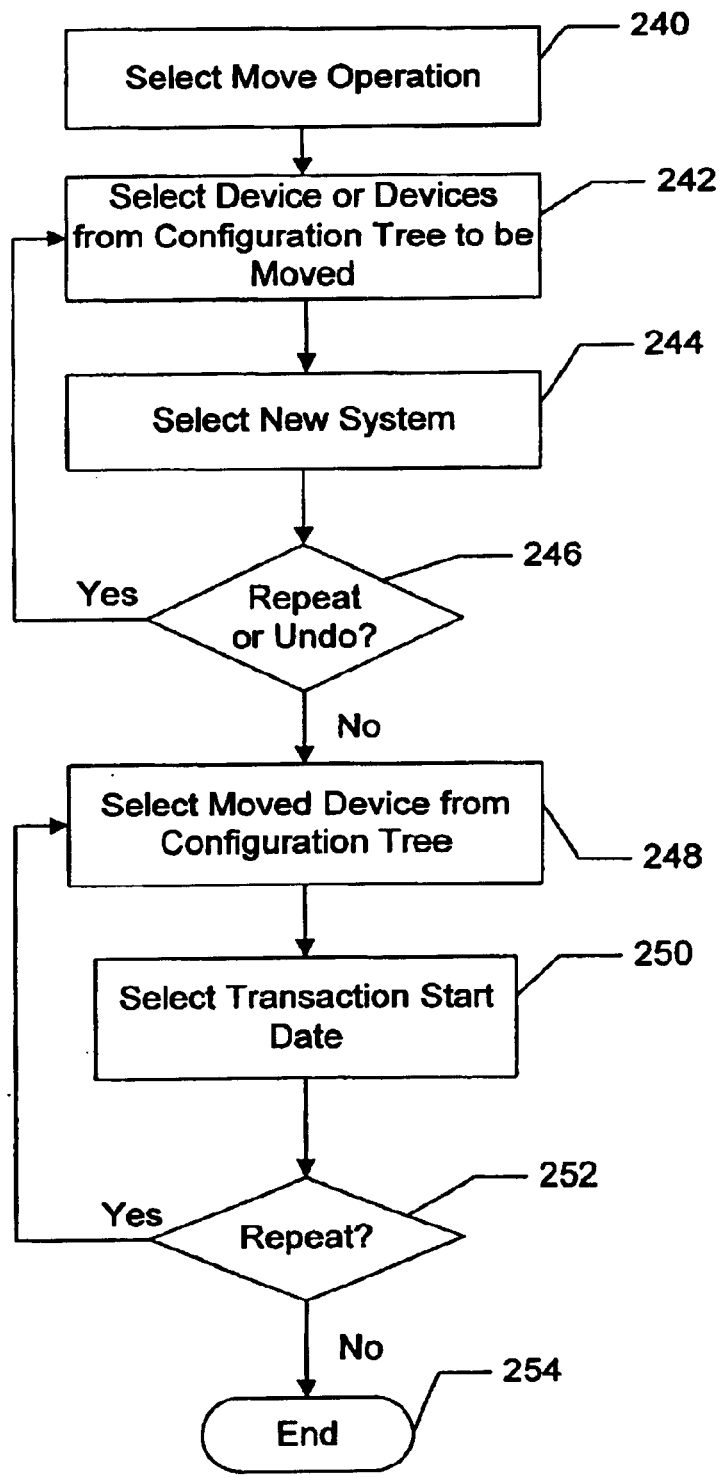
FIG. 19 is a flow chart illustrating the flow of a Move transaction.
Figure 20A:
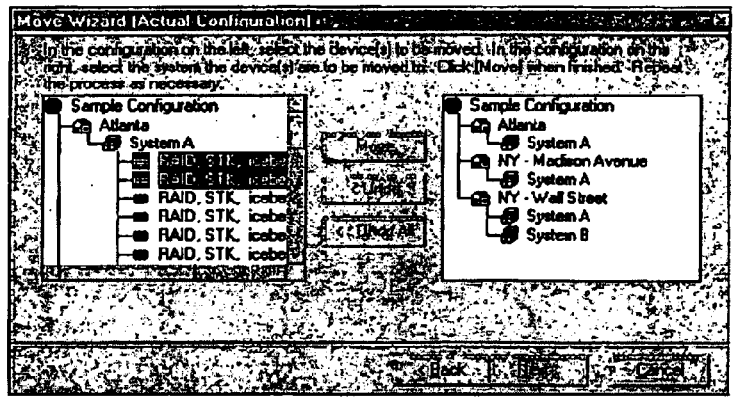
FIGS. 20A–20B show examples of displayed representations of an example of the operation of FIG. 19.
Figure 20B:
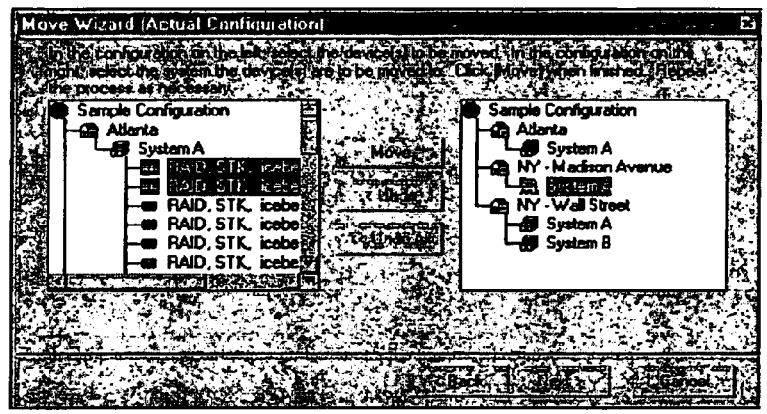

FIG. 19 depicts a flow chart illustrating a transaction in which a device is moved from one system to another. At step 240, the Move Transaction is selected. Then, the device or devices that are to be moved are selected from the configuration tree at step 242, and the system to which the devices are to be moved is selected at step 244. As step 246 shows, steps 242 and 244 may be repeated or undone. FIG. 20A shows an example of step 242 where two RAID devices have been selected, and FIG. 20B shows an example of step 244.

Then, the moved device is selected from the configuration tree at step 248, and the start date for the move is entered at step 250. Steps 248 and 250 are then repeated for each device that is to be moved, as step 252 shows.

Figure 21:
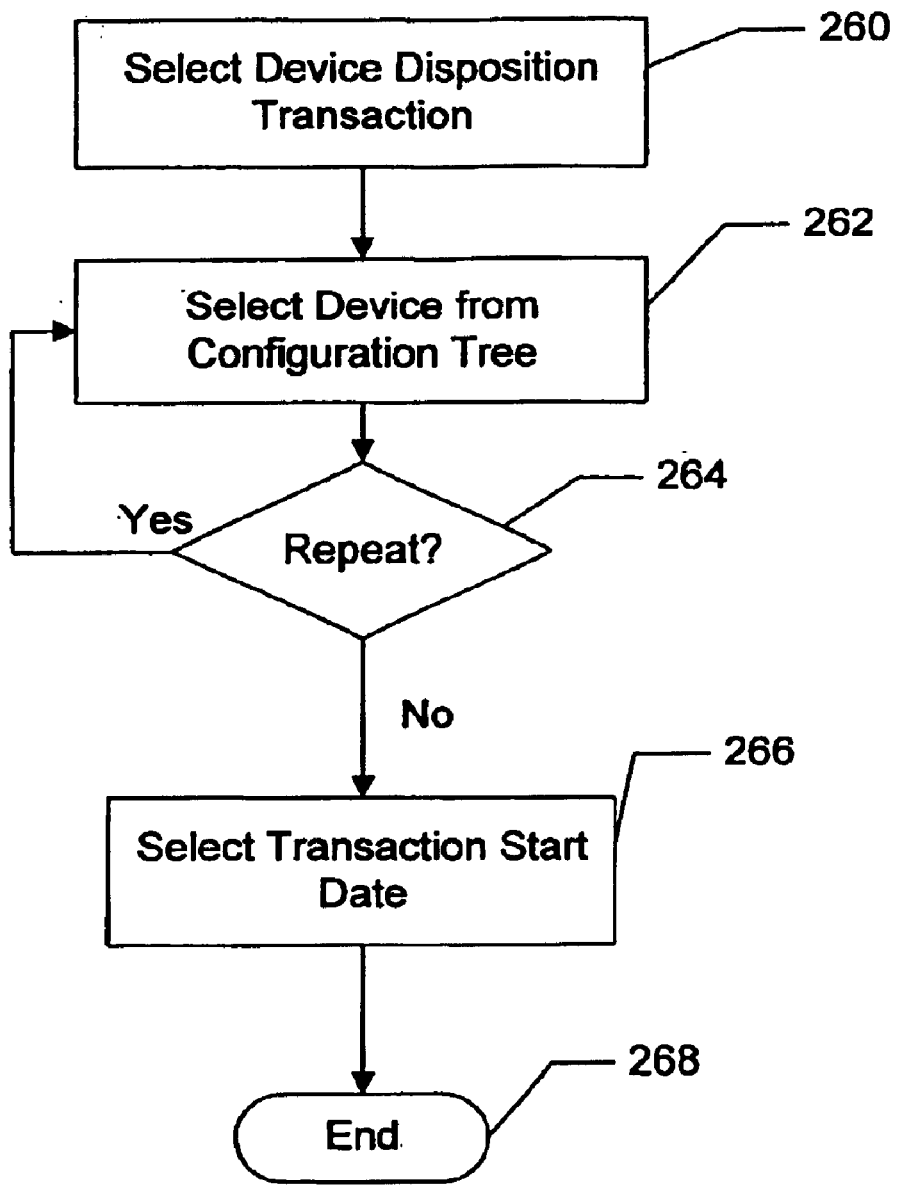
FIG. 21 is a flow chart illustrating the flow of a Device Disposition transaction.

FIG. 21 illustrates a flow chart showing the disposition of a device, namely the termination of the financial and technical life of the device, so that the associated costs and other requirements for the disposition of the device may be determined.

The disposition of a device is distinguished from the deletion of a device. Specifically, a device is deleted when, using the editor 55, all historical records of a device are removed to appear that the device never existed. By contrast, the disposition of a device represents the disposal of an existing device where the historical records of the device remain.

The Device Disposition Transaction is selected at step 260, and then the device that is to be disposed is selected from the configuration tree at step 262. As step 264 shows, step 262 may be repeated for each device to be disposed. Thereafter, the disposal date of the device is selected at step 266.

Significantly, the invention also allows for the creation of proposed changes to a configuration, namely a What-If configuration, so that the effects on the financial and technical requirements of such changes may be determined. The financial and technical specifications of an existing configuration may be compared to a configuration having a proposed change. Alternatively, the financial and technical requirements of two or more proposed configurations may be compared to each other.

As an example, an existing configuration may have several DASD devices whose leases are about to expire, and it is desired that the devices be replaced with higher capacity devices. The existing DASD devices may be replaced with newer, higher capacity DASD devices or, alternatively, the existing devices may be replaced with RAID devices. The invention shows the financial and technical ramifications of the possible change to the existing configuration prior to making any acquisition so that the optimum change may be selected.

In this example, a first What-If configuration is created by copying the existing configuration, disposing the DASD devices whose leases are to expire, and then adding the new DASD devices. A second What-If configuration is created by likewise copying the existing configuration and disposing the DASD devices whose leases will expire, but then adding the RAID devices. The financial and technical specifications of the two What-If configurations may then be compared.

Figure 22A:
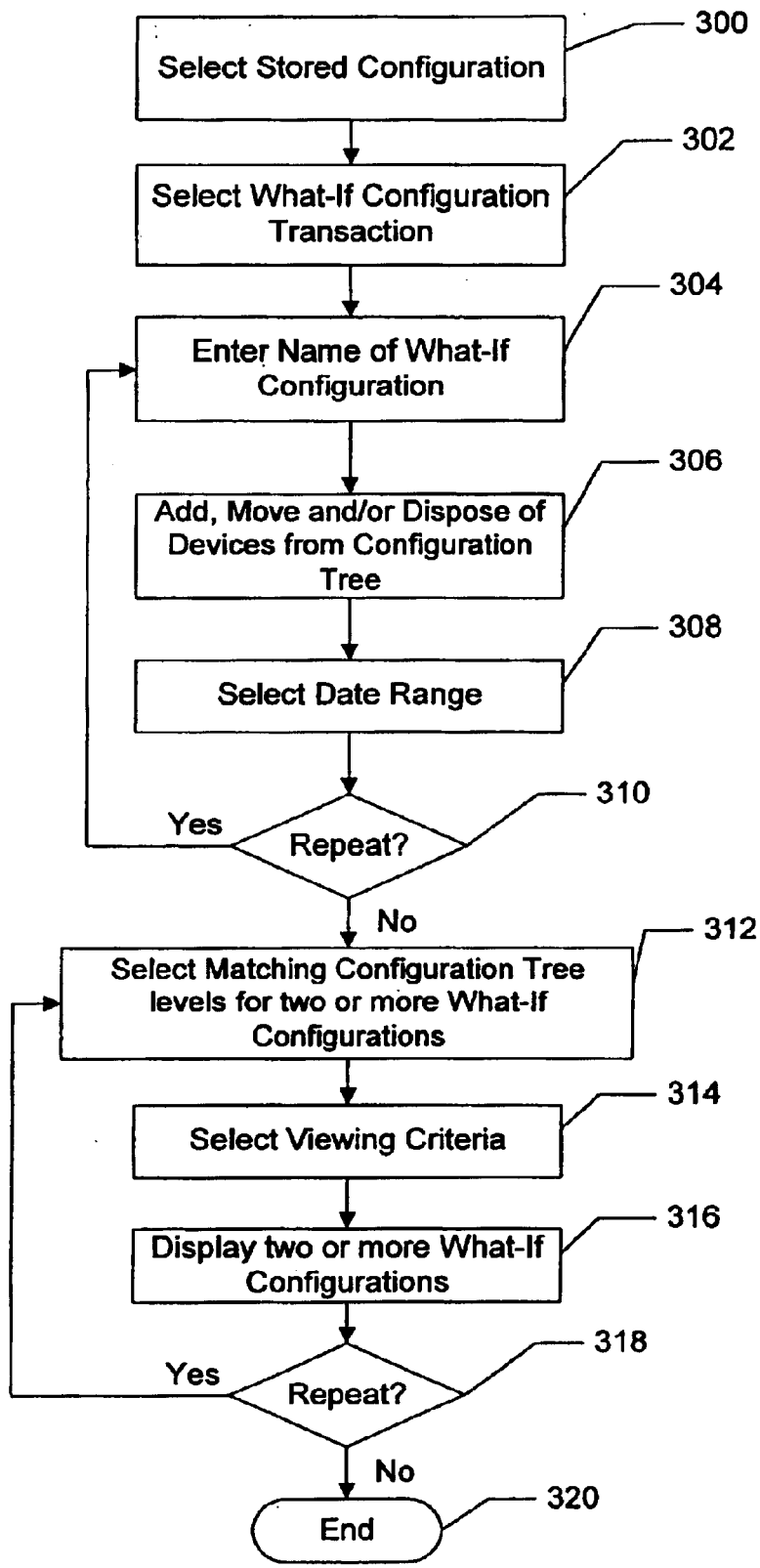
FIG. 22A is a flow chart illustrating the flow of a What-If Configuration transaction.

FIG. 22A is a flow chart illustrating the creation of two or more What-If configurations according to the invention. First, an existing stored configuration is selected at step 300, and the What-If Configuration Transaction is selected as to step 302. Then, at step 304, the name of a What-If configuration is entered, and, at step 306, one or more locations, systems, device groups or devices are added, moved and/or disposed of using the transactions described above regarding FIGS. 13A, 14A, 15A, 15B, 17, 19 and 21. An appropriate date range for the What-If configuration is then selected at step 308. Steps 304 to 308 may be repeated for each respective What-If configuration, as step 310 shows.

Figure 22B:
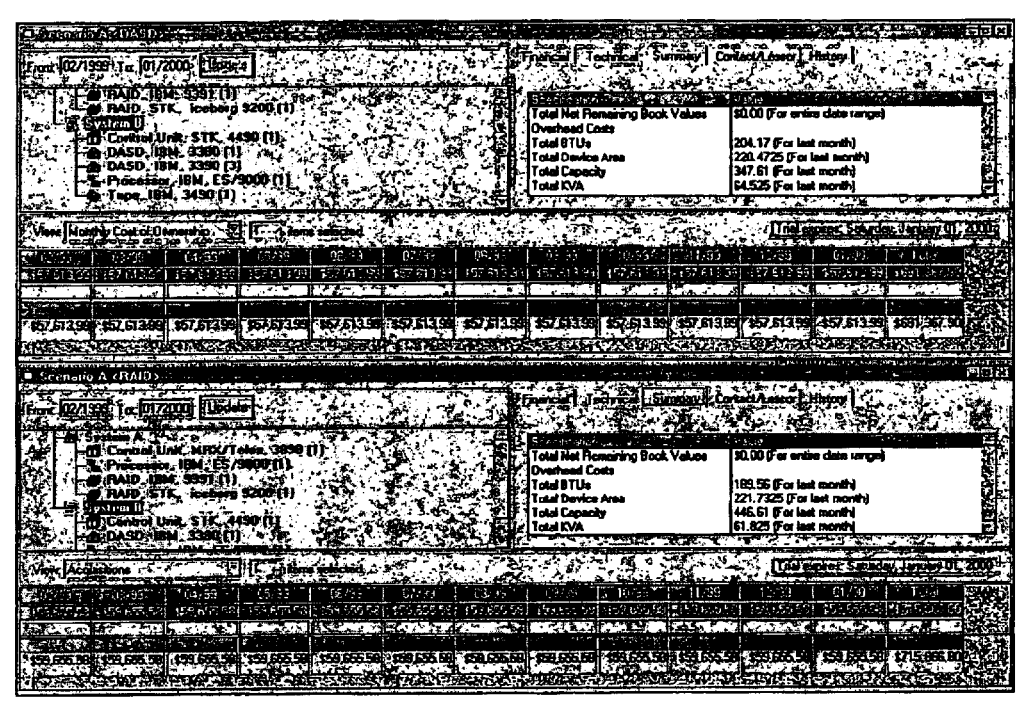

Then, the specification of two or more of the newly created What-If configurations may be compared for matching configuration tree levels and matching date ranges. The matching tree levels for two What-If configurations are selected at step 312, and then either the financial, technical, summary, contact/lessor or history tabs is selected at step 314. The selected What-If configurations are then displayed at step 316. Step 312 to 316 may be repeated for each pair of What-If configurations that are to be compared. FIG. 22B shows an example where the summary information of two What-If scenarios are displayed for corresponding date ranges and system levels.

Figure 23:
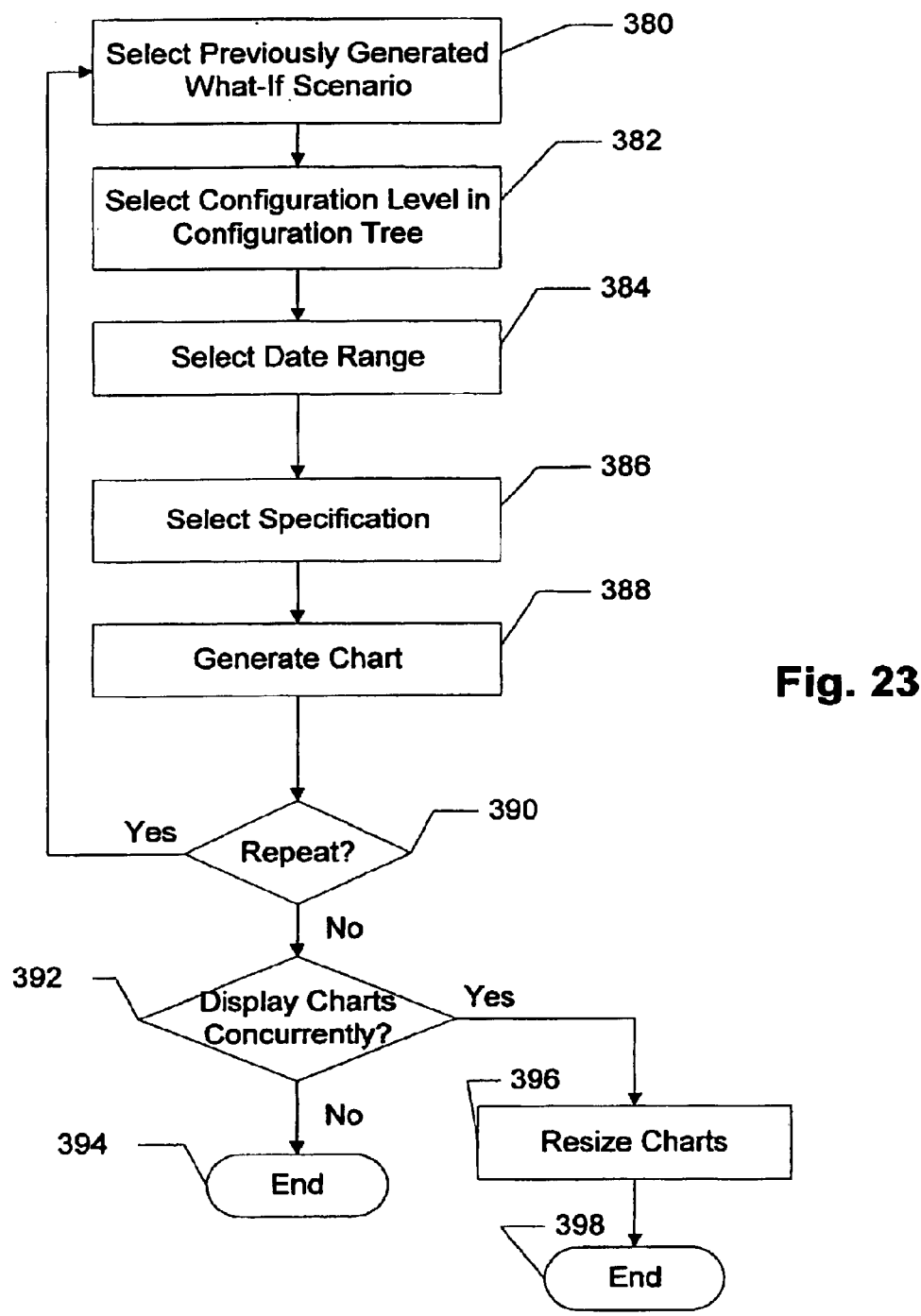
FIG. 23 is a flow chart illustrating the flow of a chart generation operation.

One or more charts representing the financial or technical information of the respective What-If scenarios may be generated, as FIG. 23 shows. Here, one or more previously generated What-If scenarios are selected at step 380, and a configuration level from the configuration tree is selected at step 382. A common date range is selected at step 384, and one of the financial, technical or summary tabs is selected at step 386, and a chart is generated at step 388. Steps 380 to 388 may be repeated for each respective What-If scenario, as step 390 shows.

Then, if it is desirable to display the charts of two or more What-If scenarios concurrently, as step 392 shows, the charts may be resized for concurrent display. FIG. 12 shows an example of two bar charts representing the total capacity of two respective What-If scenarios.

As described above, the invention allows the management of Hardware and Software Data Centers in a substantially automated manner through the use of software which relies on a knowledge base. In creating a configuration whose total cost of ownership needs to be determined, the user is allowed access to computer programs that allow the user to define a particular configuration e.g. its location, device groups, components, costs etc. The information about the financial cost is looked up and/or calculated from information stored in the knowledge base. The information in the knowledge base is often pre-stored in the knowledge base and is provided to a user who purchases the product of the invention. In addition, the information in the knowledge base can be and often is supplemented by information that is supplied by the user. In generating hardware configurations, the invention also provides so called dropdown menus which allow the user to select devices, e.g. CPUs, memory and other storage components from dropdown menus or to individually specify them. If devices or configurations are specified for which pricing information is not available in the knowledge base, such information can be hand entered by the user for reference purposes or estimated by the user for the purpose of obtaining a rough evaluation of the costs of a particular configuration.

It should be noted that the invention may also include information about the personnel costs, such as for systems operation or technical support.

Further, it should be noted that the invention is also applicable to a manufacturing configuration. Here, for example, the configuration may include factories or mills as a second level, machine types as a third level and specific machines or lathes as a fourth level.

As described above, this invention provides decision support capabilities in the planning and operation of a computer enterprise. Namely, the ability to accurately project the actual cost of ownership over time and to forecast the financial and technical effects of making a change of some kind to a current or hypothetical hardware/software configuration.

The preceding description has focused on embodiments that are hardware based. The following is a description of the additional capabilities provided by this invention for managing and projecting the actual costs of ownership over time of software products and a description of the interrelationships of the costs of software products with proposed hardware changes.

Licensing fees are typically determined by the computer on which the software will run. In the personal computer arena, users generally pay a single fixed fee irrespective of the size or speed of their computer. However, as one moves to larger systems possibly composed of servers, multi-user systems and/or mainframes, software licenses terms will vary. In some instances, software prices are based on the number of users, the model of CPU, the speed rating of the CPU or combinations of one or more of these factors. Additionally, these fees or prices may be for a limited period of time, and may include charges for maintenance and support.

The licensing fees charged by vendors for software used by large data centers is most often based upon the size of the CPU that software is run on. Users are either charged a fixed amount according to which of their CPUs fall into a particular class (more commonly known as a "model group")

or, they are charged according to the speed (MIPS rating) of a specific CPU. Furthermore, each vendor may use one, both or a combination of these pricing schedules.

There is no common basis or standard definition of a model group. Each vendor may establish his own model group pricing schedules separate and apart from what other vendors may use. For example, the assignee of the present invention, Isogon Corporation, may list seven processor groups for a software product covering all IBM processors and another company may define twenty groups for those same processors.

A typical computer installation may have dozens or even hundreds of active software licenses, each having its own pricing schedule.

By way of example, pricing and model group data are presented further on below in tabulated formats, i.e. tables 1, 2 and 3.

Table 1 presents one vendor's model grouping for selected IBM processors and their corresponding MIPS rating for comparison. Table 2 is a pricing schedule based upon MIPS ratings and Table 3 presents a sample price schedule by model group.

TABLE 1

Sample Model Groups for IBM Processors

| Processor-Model | | MIPS | Group |
|---|---|---|---|
| 3090 | 15T | 16.20 | C |
| 3090 | 17T | 16.20 | C |
| 3090 | 18T | 21.60 | C |
| 3090 | 25T | 27.00 | C |
| 3090 | 28T | 43.20 | C |
| 3090 | 100S | 5.60 | B |
| 3090 | 110J | 7.80 | B |
| 3090 | 120E | 10.00 | C |
| 3090 | 120J | 10.00 | C |
| 3090 | 120S | 7.50 | B |
| 3090 | 150 | 9.80 | B |
| 3090 | 500J | 101.00 | D |
| 3090 | 500S | 90.00 | D |
| 3090 | 600E | 74.00 | C |
| 3090 | 600J | 116.00 | E |
| 3090 | 600S | 103.00 | D |

TABLE 2

Sample MIPS based Pricing Products X & Y

| MIPS range | x $/MIPS | y $/MIPS | Maintenance & Support |
|---|---|---|---|
| 0–50 | $217 | $325 | 15% of License Fee First 12 months are included for new licenses. |
| 50–100 | 217 | 276 | |
| 100+ | 184 | 276 | |

Note: The rates in Tables 2 and 3 are one-time licensing rates. They are graduated, thus for a 60 MIPS CPU the first 50 MIPS would be at the 0–50 rate and the next 10 MIPS at the 50–100 rate. The model groups shown in Table 3 correspond to those in Table 1.

TABLE 3

Sample Model Group Pricing Product Z

| Model Group | Price | Maintenance & Support |
|---|---|---|
| A | $11,800 | 15% of License Fee First 12 months are included for new licenses. |
| B | 15,200 | |
| C | 20,800 | |
| D | 26,450 | |

When a decision maker is considering a change in hardware configuration or the purchase of some additional hardware, that decision is generally because of growth (in workload) or a consolidation to save money. As hardware costs drop, performance of CPUs increase and maintenance costs escalate, data centers will choose to replace smaller, less powerful CPUs with fewer but more powerful processors. Or, alternatively, they may choose to switch to a sysplex (IBM's clustering) of multiple processors that dynamically balance CPU workloads.

Typically, one is faced with either a new licensing situation or re-licensing of an existing software product multiplied by the number of affected software licenses. For installations having dozens or even hundreds of software licenses, the ability to examine the consequences of hardware changes or optimizations becomes increasingly difficult.

By way of example, a data center may be operating two IBM 3090/28T processors, one processor performing production work and the other primarily supporting software development. Each processor would have software licenses in place according to the mix of products on each CPU. If they then choose to replace these smaller, less powerful processors with a single but larger CPU, say an IBM 3090/500S or 3090/500J, and operate all of their licensed software on it, their licensing costs would increase due to the upgrade fees for all of their licensed software. Though vendor practices differ, upgrade fees are often calculated by subtracting the amount paid for the current license from the list price of a license for the new hardware configuration.

Using the data from Tables 1, 2, and 3, the following is a simple one year comparison for those software products. Present licensing costs are computed on the basis of the production system using product X, the development system using product Y and both systems using product Z. The licensing upgrade costs of moving to either the 500S or the 500J models are computed. The original and new licensing costs are shown in the following table for comparison and because maintenance and support fees are charged as a percentage.

| Software | 3090/28T Prod group C 43.2 | 3090/28T Dev group C 43.2 | 3090/500S group D 90.0 MIPS | | 3090/500J group D 101. MIPS | |
|---|---|---|---|---|---|---|
| License License Fees | MIPS Originally Paid | MIPS Originally Paid | List | Up-grade Fee | List | Up-grade Fee |
| Product X | $9,374 | — | $19,530 | $10,156 | $21,884 | $12,510 |
| Product Y | — | $14,040 | 27,290 | 13,250 | 30,326 | 16,286 |
| Product Z | 20,800 | 20,800 | 26,450 | 5,650 | 26,450 | 5,560 |
| Total | | | 73,660 | $29,056 | 78,660 | $34,446 |

The user will have to pay upgrade fees for products X & Y that are dramatically increased (in proportion to the MIPS rating of the proposed configuration), and, only one upgrade fee for product Z. The second license for product Z is unnecessary. However, the user will not receive any monetary credit for no longer using it.

Software costs alone are not necessarily the deciding factor. The total cost of ownership is more relevant. In order to determine the financial consequences over time of these proposed configurations, the following tables factor in some representative hardware costs to illustrate ownership costs for one year. The first table is the present configuration which establishes a baseline for comparison. The total cost of ownership (TCO) for the original 3090/28T production and development systems is $873,752.

|  | Production System | | | | | | Development System | | | | Software |
|---|---|---|---|---|---|---|---|---|---|---|---|
|  | 3090/28T | | Software Product X | | | Software Product Z | | 3090/28T | | Software Product Y | | Product Z |
| Month | Lease | Maint | License | Maint | License | Maint | Lease | Maint | License | Maint | License | Maint |
| 1 | 22,500 | 13,500 | | 117 | | 260 | 22,500 | 13,500 | | 176 | | 260 |
| 2 | 22,500 | 13,500 | | 117 | | 260 | 22,500 | 13,500 | | 176 | | 260 |
| . | . | . | . | . | . | . | . | . | . | . | . | . |
| . | . | . | . | . | . | . | . | . | . | . | . | . |
| 12 | 22,500 | 13,500 | | 117 | | 260 | 22,500 | 13,500 | | 176 | | 260 |
|  | 270,000 | 162,000 | 0 | 1,406 | 0 | 3,120 | 270,000 | 162,000 | 0 | 2,106 | 0 | 3,120 |
| TCO | 873,752 | | | | | | | | | | | |

Moving to a consolidated configuration using the model 500S IBM processor, the same 12 month period costs would be as follows:

|  | 3090/500S | | Software Product X | | Software Product Y | | Software Product Z | |
|---|---|---|---|---|---|---|---|---|
| Month | Lease | Maint | License | Maint | License | Maint | License | Maint |
| 1 | 39,800 | 21,890 | 10,156 | 244 | 13,250 | 341 | 5,650 | 331 |
| 2 | 39,800 | 21,890 | | 244 | | 341 | | 331 |
| . | . | . | . | . | . | . | . | . |
| . | . | . | . | . | . | . | . | . |
| 12 | 39,800 | 21,890 | | 244 | | 341 | | 331 |
|  | 477,600 | 262,680 | 10,156 | 2,930 | 13,250 | 4,094 | 5,650 | 3,968 |
| TCO | 780,327 | | | | | | | |

In spite of the increased software costs, the TCO can be reduced to $780,327. For sake of comparison, the decision maker now considers a consolidation to the model 500J. The 12 month cost figures are as follows:

|  | 3090/500J | | Software Product X | | Software Product Y | | Software Product Z | |
|---|---|---|---|---|---|---|---|---|
| Month | Lease | Maint | License | Maint | License | Maint | License | Maint |
| 1 | 42,600 | 23,430 | 12,510 | 274 | 16,286 | 379 | 5,650 | 331 |
| 2 | 42,600 | 23,430 | | 274 | | 379 | | 331 |
| . | . | . | . | . | . | . | | |
| . | . | . | . | . | . | . | | |
| . | . | . | . | . | . | . | | |
| 12 | 42,600 | 23,430 | | 274 | | 379 | | 331 |
|  | 511,200 | 281,160 | 12,510 | 3,283 | 16,286 | 4,549 | 5,650 | 3,968 |
| TCO | 838,605 | | | | | | | |

In the case of the IBM model 500J system, the TCO for a single year is only modestly reduced to $838,605.

Other scenarios are possible. A planning decision may consider moving from one or more separate processors to a sysplex of multiple processors that balance workloads. In this instance, multiple licenses of the same software may be involved. For example, moving from two processors to a sysplex of five may involve purchasing three additional licenses at the appropriate costs and paying upgrade fees for the other two.

While these examples are necessarily simple for the sake of clarity, one can see that when dozens or even hundreds of software products are involved, this invention becomes a valuable tool in projecting the total cost of ownership.

While this invention can, in most cases, determine and present the monthly costs and TCO of a proposed configuration from information contained in the knowledge base, the invention cannot have a perfect understanding of all possible pricing options. Accordingly, the user is provided with the ability to enter or create custom data for software products and to update information as necessary to ensure that the knowledge base properly reflects the current or proposed configuration.

In summary, the features of this invention relating software management are similar to that provided for hardware. This invention also takes into account those factors peculiar to software licensing. Some of these features are:

Knowledge base contains pricing schedules for software products;

Supports MIPS based pricing;

Supports Model Group pricing;

Supports conventional lease/purchase pricing;

Supports per user pricing;

Supports custom pricing;

Contains other relevant configuration data, e.g., vendor, version, maintenance fees, etc.;

Knowledge base can be updated and custom data for software products added;

The user interface can additionally display software product information as part of the system configuration:
  Listed as a separate item;
  Grouped according to vendor; Note that this is directly analogous to the Device Grouping feature for hardware.
  Ability to add or remove a software product from a configuration;
  Ability to move a software product from one system to another;
  Ability to determine if a multi-product discount is applicable from a vendor;
  Ability to perform a pricing comparison of a vendor's software product using both model group and MIPS based pricing when both methods are offered; and/or
  Ability to perform what-if scenarios over time to determine the total cost of ownership.

A model computer screen of the invention is shown in FIG. 33.

While the invention has been described above in relation to the optimization of the management, purchasing and maintenance of hardware and software products, it is to be noted that the asset management invention herein is applicable to and the term "assets" includes at least: real estate, automobiles, computer hardware, computer software, collectibles, stocks, bonds, options, copyrights, trademarks, patents, etc. Thus, for example, the outright purchase of an automobile places few restrictions upon the buyer. In contrast, leasing imposes stringent time limits, payment schedules, insurance requirements, penalties and other obligations upon the lessee. The real estate management firm may own or control numerous properties for which there may exist schedules of maintenance, capital improvements, rents due and payable, statutory requirements (income, real estate and business taxes; permits, licenses, etc.) and other obligations, each of which has one or more agreements establishing terms and conditions. The management, purchasing and optimization system of the present invention provides a tool for handling a diverse selection of "assets" as defined above.

Thus far, the hardware and software management tool has been described, in a manner that suggests that it is necessary for an end user to manually enter the definitional data, e.g. the hardware configuration and/or the installed software. However, the present invention includes a facility that automates the process of determining what software products are installed on a particular computer or computer system or at a data center, etc. That facility is also configured to create a data base or to automatically feed the information which it has gathered to the Management Tool of the present invention. The Auditing Tool is described below.

Detailed Description of The Auditing Tool

In FIG. 25, a computer system 1010 is illustrated with its various portions illustrated in block form. As is conventional, the computer system 1010 includes an operating system 1024 and may include an automatic job scheduler 1032. As is also conventional, the computer system 1010 connects to peripheral devices, examples of which are shown in FIG. 25 and may include storage devices 1014, 1016 and 1018, interactive user terminals 1026, 1028 and 1030, and a batch reader 1034. Not all of these peripheral devices are required to be present, and varying computer systems will have differing peripherals. The operating system 1024 may contain a centralized handler 1044 for the processing of service requests, where this is the case, services 1046a–1046e are usually also provided.

As used in this document, the term program or program module is used synonymously with executable file. Also as used herein, a "software product", or "product" is a related group of files comprising at least one module. A product may comprise additional modules and/or non-executable files. As used herein, product generally refers to a particular "version" of a given product.

The present invention provides a system for monitoring, tracking, and controlling the use of software products and the module or modules that comprise them. In a preferred embodiment, the invention includes a computer system having four main components, three of which are executable programs and one of which is an arrangement of information for use by those programs. The four main components are a surveying program, a monitoring program, a reporting program and a knowledge base.

Turning first to the surveying program 1012. The surveying program 1012 examines all the storage devices 1014, 1016 and 1018 on computer system 1010 to determine the program modules present. Optionally, the user can restrict surveying program 1012 to examine, for example, only selected storage devices or selected libraries.

The surveying program 1012 surveys storage devices 1014, 1016 and 1018 when requested to do so by an operator (e.g. operator 1026), any other program (e.g., the monitoring program 1022), or periodically. Normally, an operator 1026 invokes the surveying program 1012 to survey storage devices 1014, 1016 and 1018 when the present invention is first introduced into a computer system 1010. An operator 1026 may request the surveying program 1012 to survey a single storage device, (e.g. storage device 1014), for instance, because the operator 1026 knows either that a software product has been installed on that storage device 1014 or that a software product has been removed from that storage device 1014 since the last time the survey program 1012 surveyed that device 1014.

Typically, as shown in FIG. 27, a storage device 1014, 1016 and 1018 has a "directory" or "table of contents" 1070, and file space 1080. In the illustration shown, entries 1070*a*, 1070*b* . . . 1070*n* in the directory 1070 are associated with files 1080*a*, 1080*b* . . . 1080*n* respectively; files 1080*a*, 1080*b* . . . 1080*n* are stored in the file space 80. Usually a directory entry, e.g. 1070*a*, has associated therewith at least a file name (not shown) and a pointer to a file, e.g. 1080*a* (not shown).

Referring back to FIG. 25, the surveying program 1012 has two main sub-components. The first sub-component is a directory surveyor 1012A which examines the entries 1070*a*, 1070*b* . . . 1070*n* in the directory 1070 (see FIG. 26) to determine what program modules are present. The second sub-component is a file reader 1012B that scans the contents of the files 101080*a*, 1080*b* . . . 1080*n* not recognized on the basis of its directory entry 1070*a*, 1070*b* . . . 1070*n* alone.

In a preferred embodiment, the directory surveyor 1012A reads the directory 1070 of the storage devices 1014, 1015 and 1016, and ascertains which entries represent executable files on the basis of the entries 1070*a*, 1070*b* . . . 1070*n* in the directory 1070. How a particular operating system 1024 designates the entries 1070*a*, 1070*b* . . . 1070*n* as referring to program modules or non-executable files varies. An operating system 1024 may indicate that a directory entry 1070*a*, 1070*b* . . . 1070*n* is associated with a program module by special flags, naming convention, or otherwise; this is familiar to a person skilled in the particular operating system 1024. On PCs, for example, executable files have extensions of .EXE or .COM. (Of course, you can name a non-executable text file as if it were executable, so this is not completely reliable.) Under MVS (on IBM mainframes), executable files are recognized by the format in which they are stored and by status flags in the file directory. Again, this is not certain, but probabilistic that the program will occasionally misidentify a non-executable module as executable. Directory surveyor 1012A then compares the names of the modules it finds (in directory 1070) to module names represented in knowledge base 1020, and records pertinent information in system configuration log 1066 about the matches found.

It is important to note that the system configuration log 1066, the knowledge base 1020 and the recorded information log 1062 are general collections of information. The information comprising each of these collections may be stored in a single file or may be stored in a multiplicity of separate files and other memory areas. For example, in a preferred embodiment, the knowledge base 1020 comprises the following types of information:

Module records: For each module, a module record contains the module name and the product ID of the product to which it belongs. (As indicated earlier, module names can be indicated in a generic fashion.)

Product records: For each product, a product record contains the product ID, the product name, the vendor ID, and (optionally) the product code used by the vendor for that product.

Vendor Records: For each vendor, a vendor record contains the vendor ID and the vendor name.

Vendor Product Code Records: For particular vendors that use recognizable product codes, for each such product, the product code and the corresponding product ID. For example, IBM is known to use product codes of the form "56nn-aaa" or "57nn-aaa", where "n" is any digit (0–9) and "a" is any (printable) character. "5740-CB1", for example, is the COBOL OS/VS Compiler and Library (which, in a preferred embodiment has been assigned the product code "COBCLIB").

The knowledge base 1020 can also be used to store information, such as the strings searched for by module reader 1012B.

Further, in the knowledge base 1020, modules can be represented through the use of a wild card, i.e. in a generic fashion. For example, a single module record for the name "ABC*" would be considered to match any actual name beginning with "ABC". The use of wild cards in a search is well known in the art.

The file reader 1012B scans, or reads, the file 1080*a*, 1080*b* . . . 1080*n* associated with a directory entry 1070*a*, 1070*b* . . . 1070*n* and searches for copyright statements such as "COPYRIGHT", "COPR", or "(C)" (in either upper or lower case), recognized vendor names, recognized product names, and unique sequences or strings of text conforming to patterns recognized as product codes of particular vendors. As described above, this information, including copyright statements, vendor names, etc., which file reader 1012B looks for may be stored in the knowledge base 1020 or hard coded into the file reader 1012B. In a preferred embodiment, the file reader 1012B would scan only the modules 1080*a*, 1080*b* . . . 1080*n* associated with each directory entry 1070*a*, 1070*b* . . . 1070*n* which the directory surveyor 1012A determined did not have a corresponding module name in the knowledge base 1020. File reader 1012B makes a record for later use regarding the results of its activities, including the identification of any file that is made, this record may be made in the system configuration log 1066.

In another embodiment, file reader 1012B would scan every module, however, where directory surveyor 1012A has already determined that a file is an executable program and compared the entry with the knowledge base 1020, file reader 1012B could corroborate that information. In this embodiment, file reader 1012B would additionally record information regarding corroboration or the lack thereof; this information could be recorded in system configuration log 1066.

In a preferred embodiment, the surveying program 1012 creates two types of records: one for modules identified by the directory surveyor 1012A and one for modules identified by the file reader 1012B. Both types of records contain module name, library name, volume name (i.e., the physical disk on which the library resides) and product ID. The latter record type, which are identified on the basis of a recognizable string, also contains data in the neighborhood of that string; the amount of said data that is contained therein can be varied, in a preferred embodiment, it is 200 bytes of data.

Where a module name is not represented in the knowledge base 1020, but the vendor has been recognized because of information found by the file reader 1012B, an flag or indicator is substituted for the module name in the record. In this case, the module will appear on reports listed as being an unknown product of that vendor.

The second major component of the present invention is a monitoring program 1022. The monitoring program 1022 records pertinent information in a recorded information log 1062 when certain events occur.

Typically, for each module used, the information recorded by the monitor consists of the module name, the library name from which it was loaded, the volume of the library, the product ID, the job name using the module, the step name using the module, the job start date and time, the job number assigned by the job scheduling/managing program, and the user ID. If the module is not loaded from a library but is resident, an indication of this is recorded. Depending on the operating system, other relevant information may be available, and is recorded, and some of this information may be unavailable. For compactness, this information may be reorganized. In a preferred embodiment, one record is created containing all the job-related information (start date and time, job number, etc.), another record is created containing step related information (step name, etc.), and another record is created for each module used during that step. Later, in the reporting phase, this information is reorganized as appropriate.

In a preferred embodiment, program execution would be monitored as such an event, thus, when a program module is executed, pertinent information is recorded by the monitoring program 1022.

Among many other functions the operating system performs, it accepts instructions as input from a variety of sources including interactive users 1026, 1028, 1030, automated job schedulers 1032, batch job readers 1034, and other programs. From these many sources of instructions, the operating system constructs one or more instruction streams 1040, (see FIG. 26), which are lists of instructions to execute sequentially. In a multi-processing, multi-threading, or multi-tasking environment, several instruction streams may be operated upon concurrently.

Referring now to FIG. 26, typically, the execution of an instruction consists of several steps. When operating system 1024 is ready to the next instruction in an instruction stream, it consults a status register 1038, a special storage location in memory indicating the location of the next instruction 1040. It then fetches and loads the next instruction register 1042 used to hold the instruction to be executed.

Depending on the type of instruction, the execution can involve many different things. Typically, certain operations are considered privileged, and are performed by sub-programs of operating system 1024 or service routines on behalf of the programs requesting them. Typically, all such requests for system services via service routines are handled by one centralized handler 1044, and are then routed to the appropriate routine 1046a–1046e for actual execution. Among the service routines that are typically provided are routines that cause another module or other collection of instructions to be executed. For example, in an IBM MVS system, such instructions are LINK, LOAD, LXTL and ATTACH. In some cases, the operating system may provide a system service allowing a program to monitor which such service routines are being executed.

In some operating systems a system service (such as loading a program) is invoked directly. In other words, the requester (usually a user 1026, 1028, 1030, an automated job scheduler 1032, a batch reader 1034 or another program) invokes the service 1046a–1046e to be performed.

It is important that the monitoring program 1022 is able to "see" (i.e., detect or in other ways deduce) the occurrence of the events it is monitoring. Depending on the particulars of computer 10 and operating system 1024, there are a number of ways that the monitoring program could "see" the pertinent events.

In a preferred embodiment, the monitoring program 10022 can monitor, or "see," a system service requests as an event regardless of whether the particular operating system 1024 permits services to be invoked directly or whether they are invoked through a centralized handler 1044. The monitoring program 1022 is introduced at one or more appropriate points of the operation of the operating system 1024 so that every event desired to be monitored can be known to, or "seen" by, the program. Techniques for introducing, or "hooking", an additional set of instructions into an existing program or operating system 1024 are familiar to those skilled in the art. These may include techniques such as renaming an existing module and substituting a module with the original name or dynamically changing an address vector to point to the new program, retaining the address of the original program so it can be invoked after the new program competes its operations.

Where the operating system 1024 has a centralized handler 1044, the centralized handler 1044 often provides a "hooks" to allow a monitoring program 1022 to "see" events. "Hooks" will differ slightly in implementation and use depending on the operating system 1024. Often an operating system 1024 allows the monitoring program 1022 to execute prior to some portion, or all of, the centralized handler 1044 and potentially circumvent performance of the service 1046a–1046e, or set a flag which would cause the handler 1044 to terminate execution of the requested service 1046a–e. The appropriate points to introduce the monitoring program 1022 may include the instruction fetch and load operation, illustrated generally at 1050, the execution of the instruction, illustrated generally at 1052, the execution of the centralized service routine handler, illustrated generally at 1044, or the execution of the individual service routine, illustrated generally at 1046. For example, in an IBM, MVS system, it could be appropriate to "hook" into the execution of the centralized service routine handler, using a technique known as "SVC interception."

Where there is no centralized handler 1044, the monitoring program 1022 would "hook" into numerous places in the operating system, such as program loading and termination calls. The places to "hook" into, of course, depends upon the events to be monitored. Thus, where there is no centralized handler 1044, monitoring program 1022 would "hook" into appropriate points of the operating system 1024 which would likely include the execution of the individual service routines, for instance: a program loader, in the case where program "load" is being monitored.

Referring back to FIG. 25, the third main component of the present invention is the reporting program 1060 which sorts, correlates, consolidates, summarizes, formats and outputs reports 1064 based upon the information gathered by surveying program 1012 and monitoring program 1022, e.g. the information stored in system configuration log 1066 and recorded information log 1062 respectively.

In a preferred embodiment, reporting program 1060 can, using the information stored in system configuration log 1066 and recorded information log 1062, produce output reports 1064. To produce reports, reporting program 1060 correlates the recorded information regarding events that have occurred and surveyed products on the computer system and can produce an almost infinite variety of reports. For instance, after correlating this information, reporting program 1060 could produce reports: listing the products that are installed in duplicate along with a list of users which are accessing each copy; listing the number of accessed per unit time for any product; listing products which are routinely denied access due to the number of licenses; listing products that are accessed (or attempted) by unauthorized users; and listing all versions of a product currently installed, along with a list of the number of users that utilize each. Of course, many other reports can be made using this information; once the event data is correlated with the associated software product, the analysis and assembly of the remainder of this information into useful reports would be familiar to one of skill in the art.

In a preferred embodiment, the reporting program 1060 comprises two components, the identifier 1060A and the reporter 1060B. The identifier 1060A does the most of the correlating, consolidating and filtering that would be necessary to produce any report. (The identifier, for example, associates the product ID code and module records and searches for various text strings stored for records identified on the basis of a recognizable string.) The reporter 1060B performs only the final stages of sorting, consolidating and formatting. The fourth main component of the present invention is the knowledge base 1020 which comprises module names and the relationship of the modules to products with which they are associated. Knowledge base 1020 may contain other information, such as product names, vendor names, vendors' product numbers, etc.

At a typical computer installation, the present invention is loaded into the computer system 1010 and the surveying program 1012 is run. Once this has been done, the monitoring program 1022 may be run continuously or for a sampling period. (Note that it is typical, but not required, that the surveying program 1012 is run prior to running the monitoring program 1022.) Once the surveying program has surveyed the storage devices 1014, 1016 and 1018 and the monitoring program 1022 has run for at least a sample period, the reporting program 1060 may be run to report on system usage during the sampling period.

Now turning to an examination of each component in more detail, in typical usage, the surveying program 1012 is executed so that it may examine the storage devices 1014, 1016 and 1018 on computer system 1010 and determine what executable files are present. Using the information contained in knowledge base 1020, surveying program 1012 determines which products are installed on computer system 1010. This information is recorded in system configuration log 1066 for use at a later time and may be optionally presented to the user in printed format, on-line display, or output in some other suitable form 1064.

In a preferred embodiment the information is presented to the user at an on-line display 1068 where the information may be searched, scanned, and otherwise manipulated. This information may be presented to the user by surveying program 1012 itself, by reporting program 1060, or by another program. Programs to display and manipulate information are well known in the art.

If the operating system 1024 or an extension thereto were to so provide, the monitoring program 1022 could be configured to monitor the installation of new software as an event. When monitoring program 1022 detects that new software has been installed, it could invoke surveying program 1012. By so invoking surveying program 1012, the information regarding installed products would be kept up to date automatically.

The Interfacing of the Asset Management Tool with the Auditing Tool

As shown in FIG. 31, the present invention interfaces the Auditing Tool (an example of which is a commercial product sold by the assignees of the present invention under the trademark SoftAudit) with the Asset Management Tool described above. In effect, the interface provides an automatically created data base of installed software which the Asset Management tool may automatically access to create a "configuration" of software at a given (or defined) data center site. The facility dispenses with (or at least reduces) the need to manually enter into the Asset Management Tool the names and locations (and associated CPUs) of the possibly hundreds of software products that may be associated with a given (or hypothetical) data center.

Moreover, the auditing function described herein provides information about either or both of the inventory and frequency of use of various software products at or on different computers or computer systems or data centers. This information is also relevant and useable by the asset management tool of the present invention. Therefore, the present invention also includes the expedient of feeding the information concerning the inventory and/or usage of software to the management tool to allow various data center configurations to be modeled and evaluated from the point of view of arriving at a total cost of ownership evaluation data.

One important benefit of combining the auditing tool with the asset management tool as described above, ensues from the ability of the combined tools to reconcile data that are obtained separately, to provide meaningful information when combined properly.

The asset management tool provides total cost of ownership (TCO) analysis on hardware, software or both. The auditing tool provides inventory and/or usage statistics on software. When these data types are combined, the benefits derived include:

Determine the total cost of ownership of software based on usage level, i.e., heavily versus lightly used software;

Allocate the chargeback of burdened costs based on software product usage. For example, calculate the direct costs of software usage (i.e., license and maintenance fees) and the indirect costs of operating the computer system to determine how they should be charged back to the users.

What-if analysis to model how moving users (or groups of users) from one hypothetical configuration to another with affect cost and technical requirements.

Determine the total cost of ownership based upon users or groups of users. For example, for a group of users, what configurations are used and what are their usage levels (hardware, software or both)?

For a group of users, what is the minimum hardware/software configuration and what is the total cost of ownership?

What-if analysis to model how changes in software usage levels will affect chargebacks.

What-if analysis to determine how the distribution of software product inventory affects financial and technical requirements of the current or proposed computer installation;

What-if analysis for removing unused software;

Financial considerations of using auditing data (e.g., where software products are installed, how much they are used, etc.) to examine hypothetical configurations of moving software to smaller processor(s); Use the usage information to further suggest what-if financial scenarios to explore. For example, the scenario of eliminating unused or low-usage software.

Use the inventory auditing information to suggest what-if scenarios to explore. For example, if the same software product is installed in multiple locations and could be consolidated; if multiple versions are installed and could be standardized; if similar or overlapping products are installed and could be reduced to a single, standardized product.

Use the inventory data derived from the auditing tool to populate the asset management tool software configuration, optionally permitting the user to assign costs. In this way, the user knows that the "actual" software configuration in the tool that he starts with is accurate;

Use the inventory data derived from the auditing tool to determine that each item in the software configuration of the asset management tool has a cost associated with it, optionally permitting the user to assign costs.

Likewise, the user is able to be selective in his queries by optionally selecting processors, specified locations, and/or within user-specified organizational subdivisions to narrow the desired results.

Referring to FIG. 32A, the View Management capabilities of the tool enables the user to define a view wherein the various asset and auditing data elements are first selected by the user and, second, organized according to manner in which it is presented. For example, the user has defined a view named "Software Inventory and Usage by Configuration." The user has further chosen to view auditing data according to the installed software products and related usage data. Subsequently, in FIG. 32B, the tool presents the user with the auditing information summarized for the assets contained in the Albany ADC configuration. Should the user decide, he can further refine the view to examine auditing data correlated to the individual assets in the Albany ADC configuration.

Once a view has been selected, all data is presented to the user according to the definition for that view until it is changed by the user. When the data is presented to the user on a computer display in a tabular, spreadsheet, or graphical format, the same style format is used when a printed report is desired.

Additional properties of a view definition are to control the process by which data is imported into the tool or exported from the tool, optionally overriding the format in which the data is imported or exported. For example, a user desiring to export data according to the view definition "Software Inventory and Usage by Configuration" shown in FIGS. 32A and 32B would simply select that view, select the desired configurations, and execute a command that exports the data. The export facility uses the current view definition in combination with the user's selections to export only that data. If the current view exports the data in a flat-file textual format, the user can, for example choose a spreadsheet format.

Additional View Management capabilities include adding, deleting, duplicating, saving a current view, defining a view template, and altering a view definition.

Although the present invention has been described in relation to particular embodiment thereof, many other variations and modifications and other uses will be apparent to those skilled in the art. It is preferred, therefore, that the present invention be limited not by the specific disclosure herein, but only by the appended claims.

What is claimed is:

1. A method for assessing the financial cost of ownership of a configuration of at least one computer data center defined by a plurality of elements, through the use of systematic, computer assisted procedures, the method comprising the steps of:
   a) modeling elements of a data center configuration on a computer by identifying to the computer the elements of a given configuration, said step being carried out at least in part by an auditing tool which identifies at least a portion of the elements of the configuration in a substantially automatic manner;
   b) providing in a knowledge base financial information which reflects financial ownership costs of a plurality of the elements;
   c) correlating information stored in the knowledge base with elements of the configuration;
   d) outputting at least a portion of the configuration and at least a portion of the associated information to a user; and
   e) including performing the modeling step and the correlating step by means of a substantially automatic software controlled process and said correlating step including calculating the financial ownership costs over selected time periods.

2. The method of claim 1, in which the configuration includes information defining at least one data center location, at least one system within the location, at least one device group within the system, and at least one device within the device group.

3. The method of claim 1, further including altering at least one of a plurality of hardware elements of configuration and substantially automatically recorrelating the altered configuration with information stored in the knowledge base and generating a revised output reflecting the changes to the configuration.

4. The method of claim 1, wherein the modeling step includes modeling one or more software products associated with at least some of hardware elements and the knowledge base includes financial information reflecting the ownership costs of the software products and the outputting step includes displaying of financial information reflecting the cost of using the software products in conjunction with a selected hardware configuration.

5. The method of claim 1, including storing in the knowledge base, for at least a plurality of software products, financial information which reflects ownership costs of the software products related to hardware elements with which the software products are used.

6. The method of claim 1, including the step of providing in the knowledge base pre-stored lists of hardware elements and enabling a user to select hardware elements for inclusion in the modeling of said data center configuration.

7. The method of claim 1, including the step of providing in the knowledge base pre-stored lists of software products and enabling the user to select software products for inclusion in the modeling of said data center configuration.

8. The method of claim 1, including calculating the present value of the financial ownership costs modeled over selected time periods and time intervals contained therein.

9. The method of claim 1, wherein said financial ownership costs includes the costs of electrical usage by hardware elements of said at least one computer data center.

10. The method of claim 1, wherein said financial ownership costs includes space costs used by hardware components of said at least one computer data center.

11. The method of claim 5, including calculating ownership costs of the software products based on CPU model groups on which the software products are intended to be used.

12. The method of claim 5, including calculating ownership costs of the software products based on MIPS ratings of CPU hardware elements with which the software products are intended to be used.

13. The method of claim 2, including preparing a respective configuration for a plurality of devices within the location and including moving at least one device from one data center configuration to another.

14. The method of claim 2, including enabling the disposition of the device in a manner such that historical records of the device remain stored in the system.

15. The method of claim 2, including enabling calculating the replacement of at least one device within the device group with one or more other devices to show financial and technical ramifications of such replacement without losing original information stored for a given configuration prior to the replacement step.

16. The method of claim 1, in which the elements of the configuration identified by the auditing tool are software products.

17. The method of claim 16, in which the auditing tool performs an inventory of the software products of the data center configuration.

18. The method of claim 16, in which the auditing tool includes a monitoring tool which monitors the execution of software modules and includes a correlating tool which correlates the software modules with software product names.

19. The method of claim 16, in which the auditing tool includes a knowledge base which associates software product module names with software product names.

20. The method of claim 1, in which the auditing tool performs both inventorying and auditing of execution of software products at the data center configuration.

21. The method of claim 16, including providing lists of software products identified by the auditing tool to a user and permitting the user to select from among the identified software products selected software products to be included in the modeled elements of the data center configuration.

22. The method of claim 16, including operating the auditing tool on a periodic basis and dynamically updating the data center configuration on the basis of the periodic operation of the auditing tool.

23. The method of claim 1, including calculating the ownership costs over time intervals contained within said selected time periods.

24. An apparatus for managing at least one of hardware and software elements of at least one computer data center, said apparatus comprising:
 a knowledge base that stores information concerning a plurality of the elements;
 a configuration storage that stores at least one configuration that defines at least one location, at least one system within the location, at least one device group within the system, and at least one device within the device group;
 an auditing tool which identifies at least a portion of the elements of the configuration in a substantially automatic manner by gathering data about the data center;
 a correlator that correlates information stored in said knowledge base that is associated with essentially each element of said configuration and stores said associated information in said configuration storage;
 a display generator that generates a display comprising at least a portion of said configuration and at least a portion of said associated information; and
 further comprising a table generator which generates table information of at least a portion of said associated information for selected ones of said location, system, device group and device of said configuration over a selected time interval; said table information being delivered to said display generator.

25. The apparatus of claim 24, wherein said associated information stored in said configuration storage includes financial information concerning at least one of the location, system, device group and device of said configuration.

26. The apparatus of claim 24, wherein said associated information stored in said configuration storage includes technical information concerning at least one of the location, system, device group and device of said configuration.

27. The apparatus of claim 24, wherein said associated information stored in said configuration storage includes a summary of financial and technical information of at least one of said location, system, device group and device of said configuration.

28. The apparatus of claim 24, wherein said associated information stored in said configuration storage includes software product information associated with the device of said configuration.

29. The apparatus of claim 24, wherein said associated information stored in said configuration storage includes history information of the device of said configuration.

30. The apparatus of claim 24, further comprising a chart generator that generates a chart representing the table information for delivery to said display generator.

31. The apparatus of claim 24, further comprising a report generator that generates a report of at least a portion of said configuration and of said associated information over a selected time interval.

32. The apparatus of claim 24, further comprising an editor for editing said configuration and said associated information stored in said configuration storage and for editing the information stored in said knowledge base.

33. The apparatus of claim 24, in which the auditing tool includes a monitoring tool which monitors the execution of software modules and includes a correlating tool which correlates the software modules with software product names.

34. The apparatus of claim 24, in which the auditing tool includes a knowledge base which associates software product module names with software product names.

35. The apparatus of claim 24, in which the auditing tool performs both inventorying and auditing of execution of software products at the data center configuration.

36. The apparatus of claim 24, including providing lists of software products identified by the auditing tool to a user and permitting the user to select from among the identified software products selected software products to be included in the modeled elements of the data center configuration.

37. The apparatus of claim 24, including operating the auditing tool on a periodic basis and dynamically updating the data center configuration on the basis of the periodic operation of the auditing tool.

38. The apparatus of claim 31, in which the report generator generates a report for time intervals contained within said selected time periods.

39. The method of claim 8, including calculating the present value of the financial ownership costs modeled over time intervals contained within said selected time periods.

40. The apparatus of claim 30, in which the report generator generates a report of at least a portion of said configuration and of said associated information over time intervals contained within said selected time interval.

* * * * *